US012194939B2

(12) United States Patent
Ishida et al.

(10) Patent No.: US 12,194,939 B2
(45) Date of Patent: Jan. 14, 2025

(54) DRIVER SEAT AIRBAG DEVICE

(71) Applicant: Autoliv Development AB, Vargarda (SE)

(72) Inventors: Ryoraro Ishida, Kanagawa (JP); Sumit Kumar, Kanagawa (JP); Kazuhiro Abe, Kanagawa (JP); Hiroyoshi Shimono, Kanagawa (JP); Keisuke Honma, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 18/261,619

(22) PCT Filed: Jan. 11, 2022

(86) PCT No.: PCT/JP2022/000582
§ 371 (c)(1),
(2) Date: Aug. 8, 2023

(87) PCT Pub. No.: WO2022/158334
PCT Pub. Date: Jul. 28, 2022

(65) Prior Publication Data
US 2024/0067117 A1    Feb. 29, 2024

(30) Foreign Application Priority Data

Jan. 20, 2021    (JP) ................................. 2021-007465

(51) Int. Cl.
*B60R 21/203* (2006.01)
*B60R 21/217* (2011.01)
(Continued)

(52) U.S. Cl.
CPC ...... *B60R 21/2037* (2013.01); *B60R 21/2176* (2013.01); *B62D 1/11* (2013.01); *B60R 2021/2175* (2013.01)

(58) Field of Classification Search
CPC ............ B60R 21/2035; B60R 21/2037; B60R 21/2176; B60R 2021/2175; B62D 1/04; B62D 1/11; B62D 7/22; B62D 7/222
(Continued)

(56) References Cited

U.S. PATENT DOCUMENTS

2020/0101997 A1 *  4/2020  Ikeda .................. B60R 21/2037
2020/0156691 A1 *  5/2020  Jung ........................ B62D 1/10
(Continued)

FOREIGN PATENT DOCUMENTS

EP        3594087 A1 *  1/2020  ........... B60R 21/203
EP        3632752 A1 *  4/2020  ......... B60R 21/2035
(Continued)

*Primary Examiner* — Jason D Shanske
*Assistant Examiner* — Daniel M. Keck
(74) *Attorney, Agent, or Firm* — Foley & Lardner LLP

(57) ABSTRACT

The present invention, includes: a damper unit provided between an airbag module that acts as a damper mass for a steering wheel and the steering wheel to dampen vibrations of the steering wheel, an engagement mechanism provided in the airbag module that maintains the airbag module on the steering wheel in a relatively displaceable manner, and protecting means provided on the airbag module for stopping external forces to the engagement mechanism in a non-engaged state with the steering wheel, that may cause deformation, and thereby protecting the engagement mechanism.

15 Claims, 29 Drawing Sheets

(51) Int. Cl.
  *B62D 1/04*  (2006.01)
  *B62D 1/11*  (2006.01)
  *B62D 7/22*  (2006.01)

(58) Field of Classification Search
  USPC .......................................... 280/728.1, 728.2
  See application file for complete search history.

(56) References Cited

U.S. PATENT DOCUMENTS

| | | | | |
|---|---|---|---|---|
| 2020/0189657 | A1* | 6/2020 | Gothekar | B60R 21/2037 |
| 2021/0039704 | A1* | 2/2021 | Kiyohara | B60R 21/203 |
| 2021/0269080 | A1* | 9/2021 | Kim | B60R 21/2037 |
| 2023/0382341 | A1* | 11/2023 | Schütz | F16F 7/108 |

FOREIGN PATENT DOCUMENTS

| | | | |
|---|---|---|---|
| JP | 2015-512831 | A | 4/2015 |
| JP | 2017-065332 | | 4/2017 |
| JP | 2017-065332 | A | 4/2017 |
| JP | 2017-088115 | | 5/2017 |
| JP | 2017-088115 | A | 5/2017 |
| JP | 2017-177927 | | 10/2017 |
| JP | 2017-177927 | A | 10/2017 |
| JP | 2017-177928 | | 10/2017 |
| JP | 2017-177928 | A | 10/2017 |
| JP | 2020-026263 | A | 2/2020 |
| JP | 2020-055363 | | 4/2020 |
| JP | 2020-055363 | A | 4/2020 |
| KR | 10-2009-0050682 | | 5/2009 |
| KR | 10-2009-0050682 | A | 5/2009 |
| WO | 2021/145150 | A1 | 7/2021 |
| WO | WO-2021/145150 | | 7/2021 |
| WO | 2021/192496 | A1 | 9/2021 |
| WO | WO-2021/192496 | | 9/2021 |

* cited by examiner

[FIG. 1]
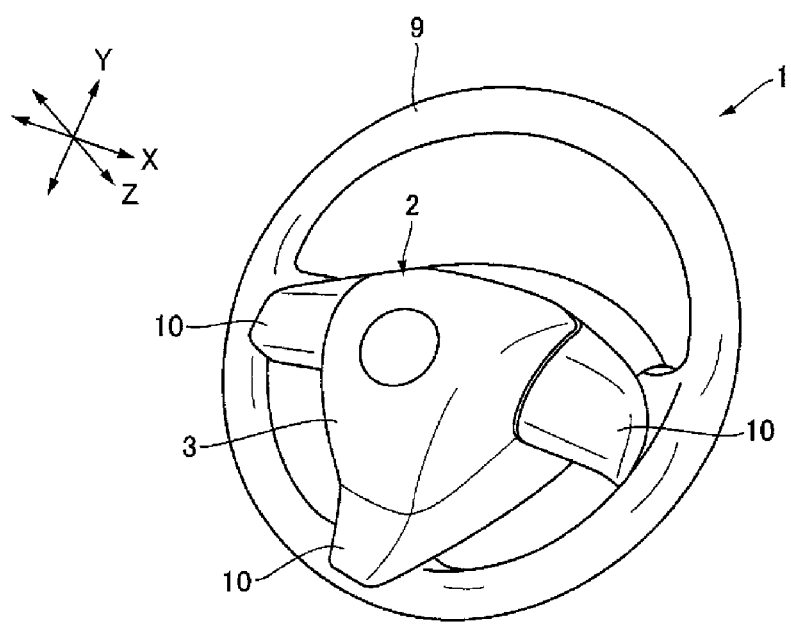

[FIG. 2]
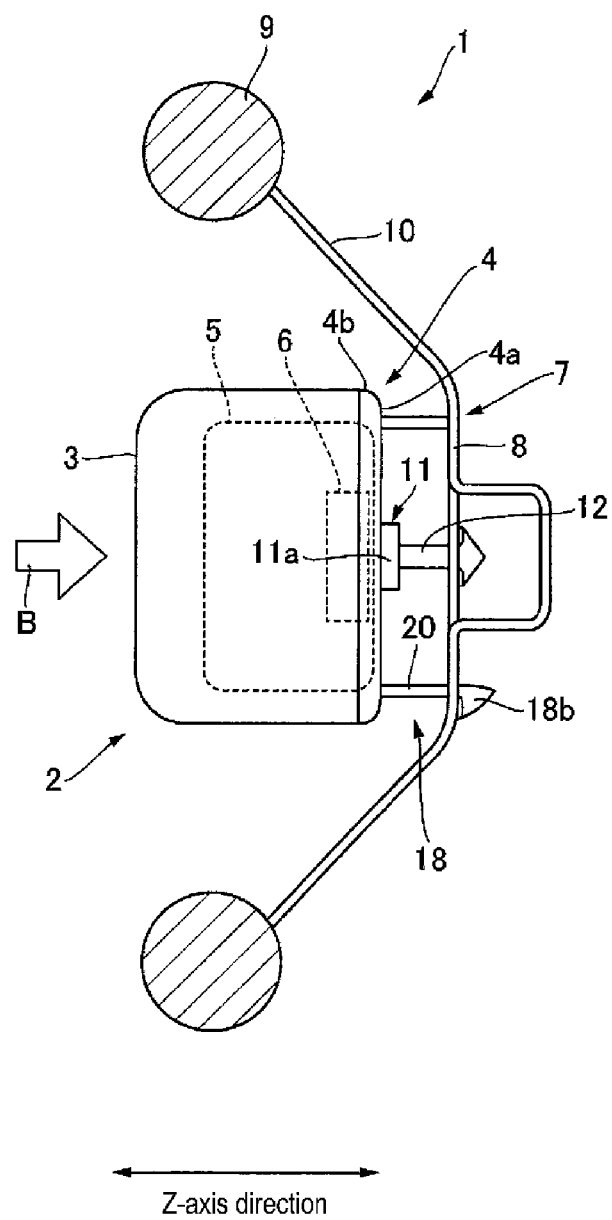

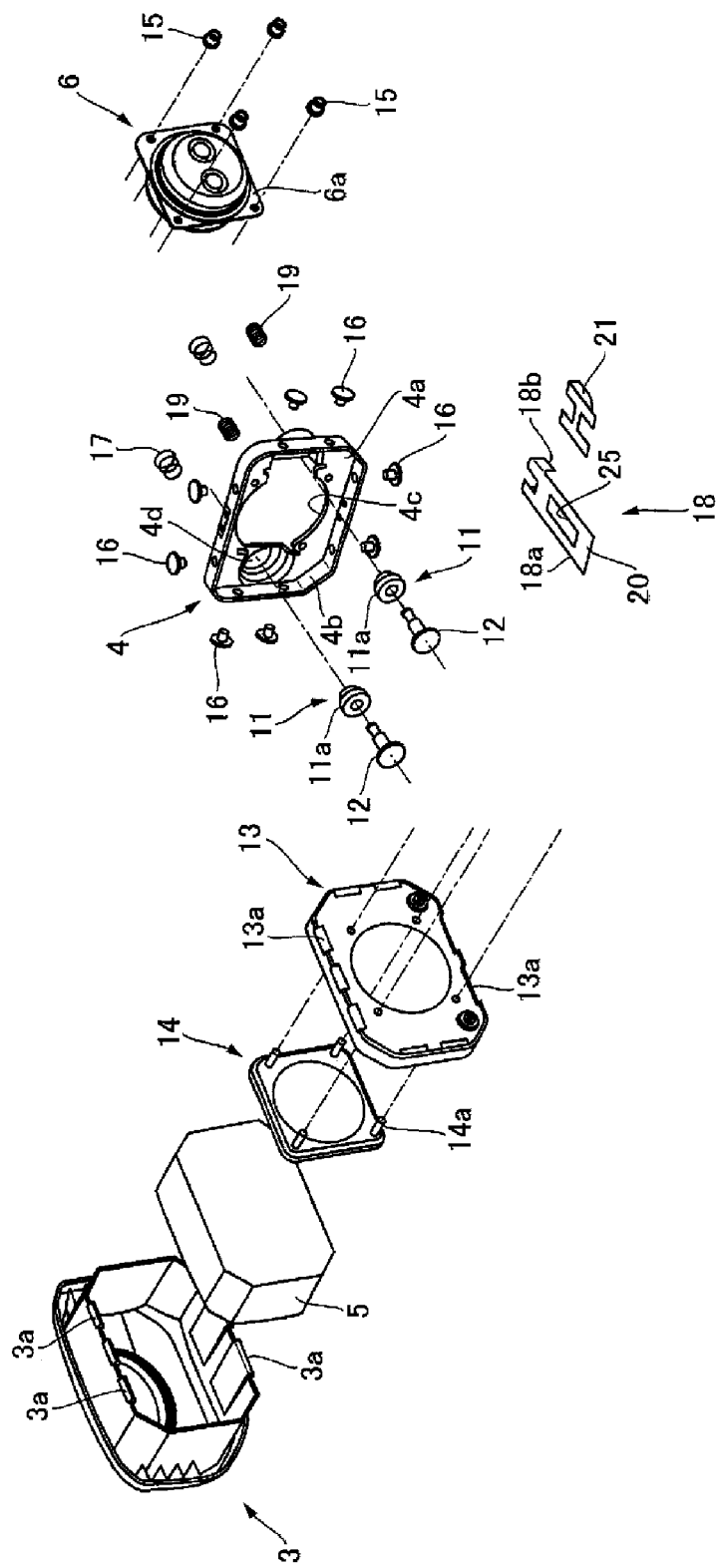
[FIG. 3]

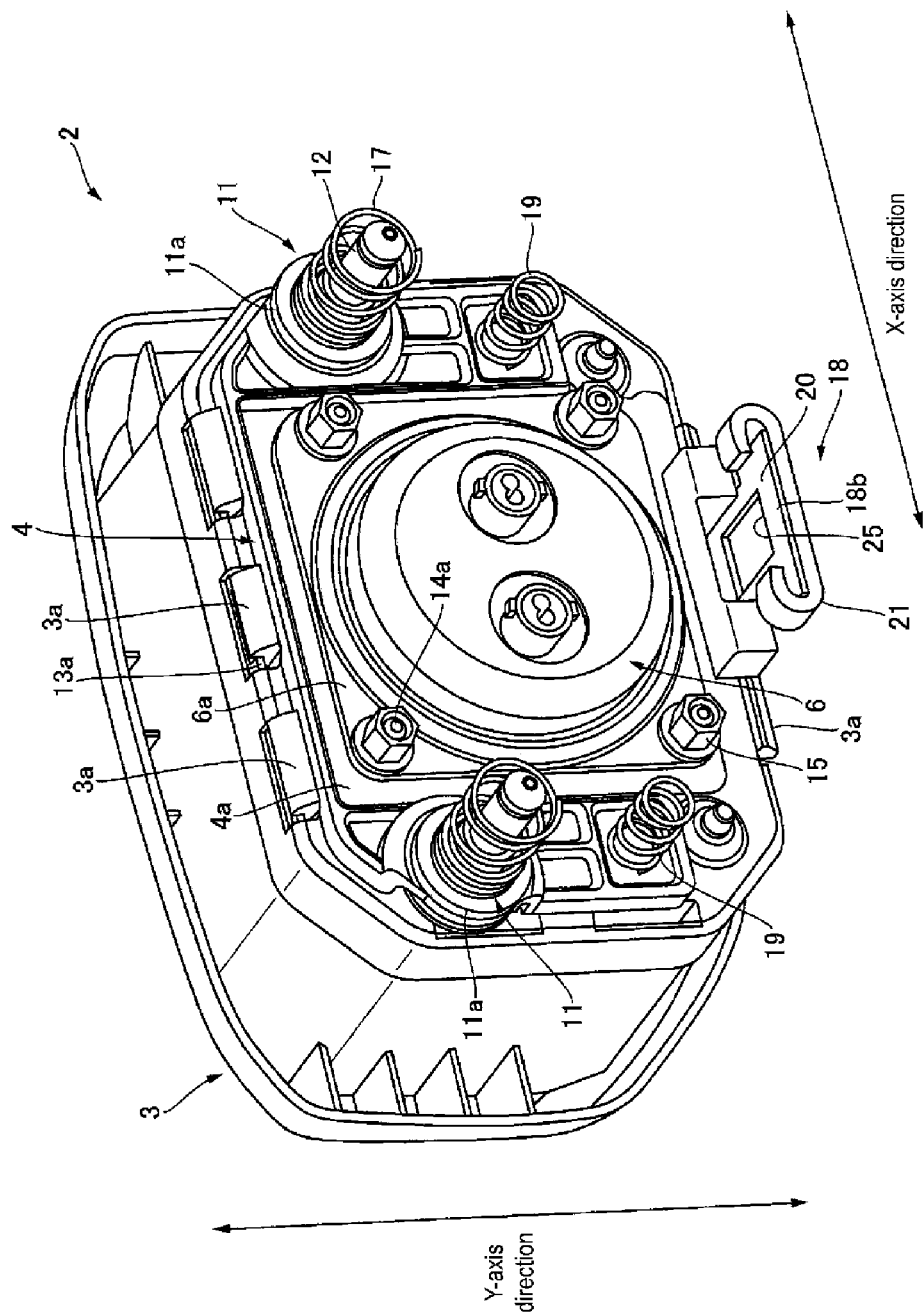
[FIG. 4]

[FIG. 5]
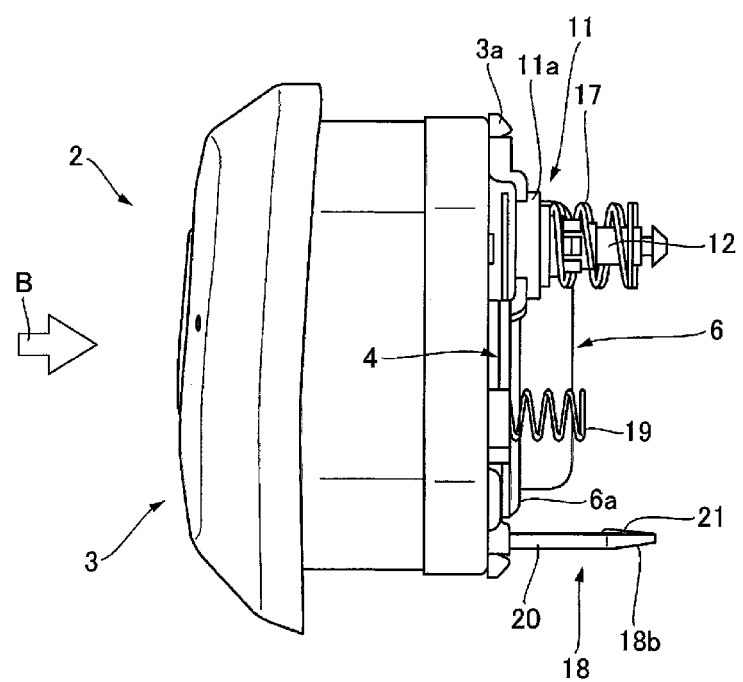

[FIG. 6]
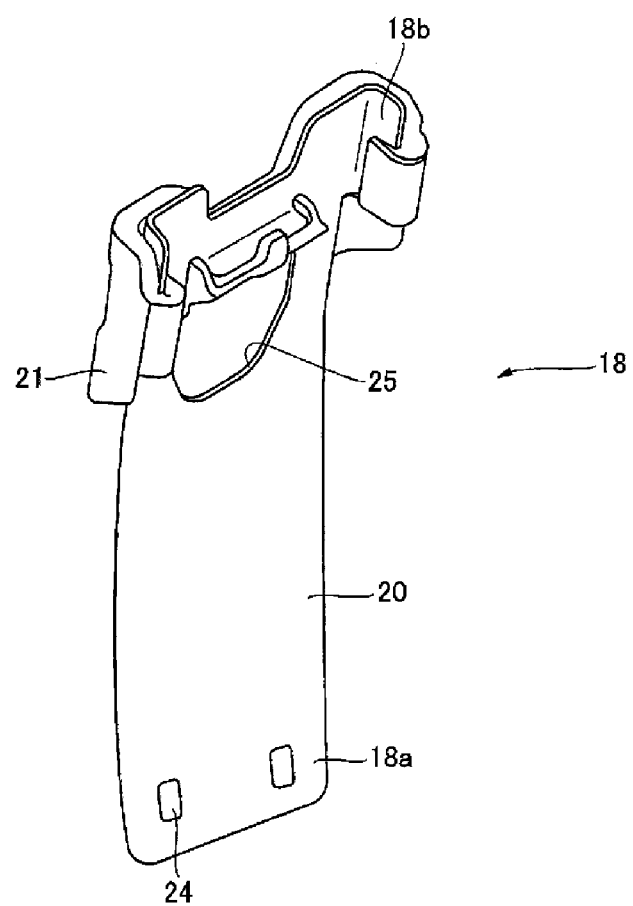

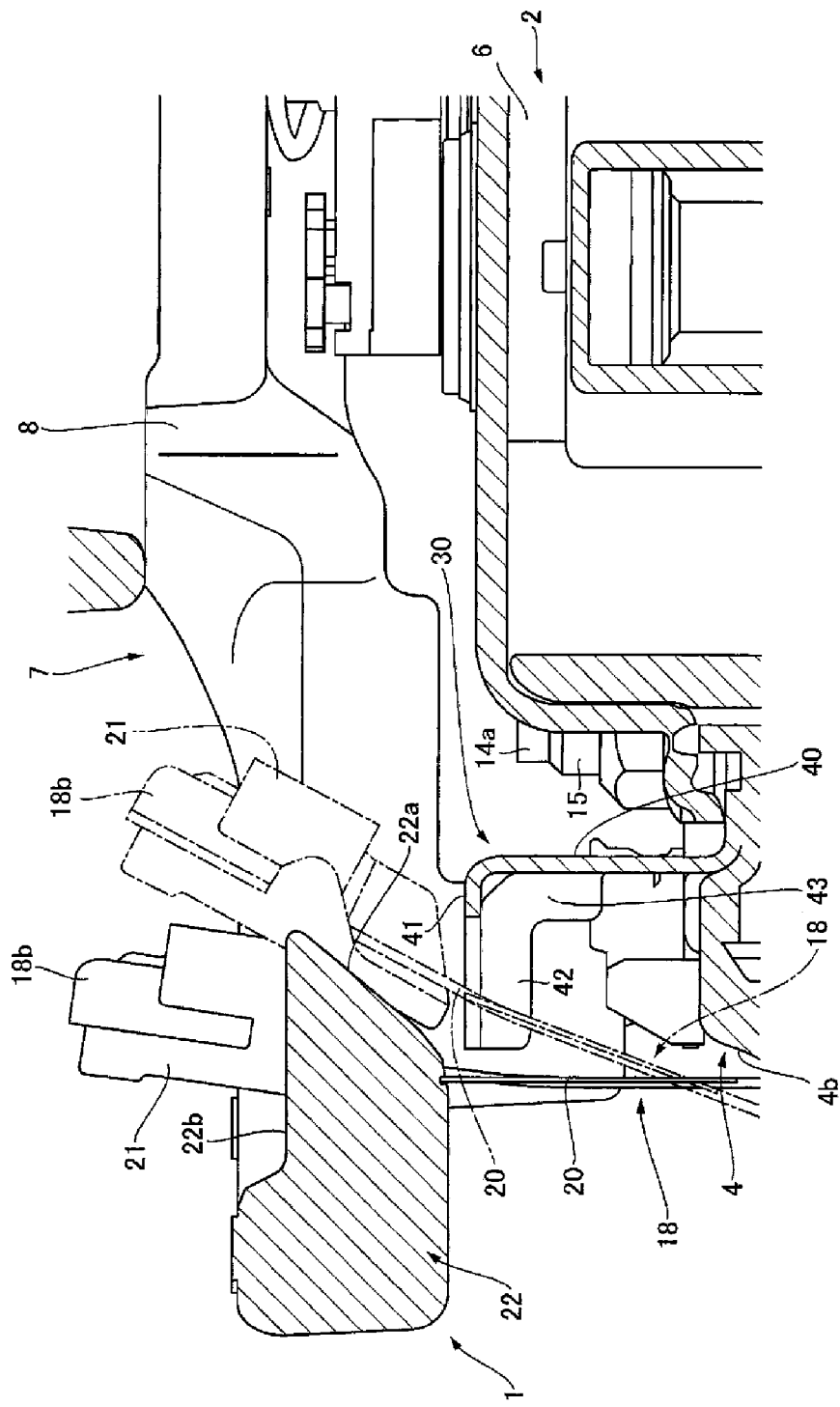
[FIG. 7]

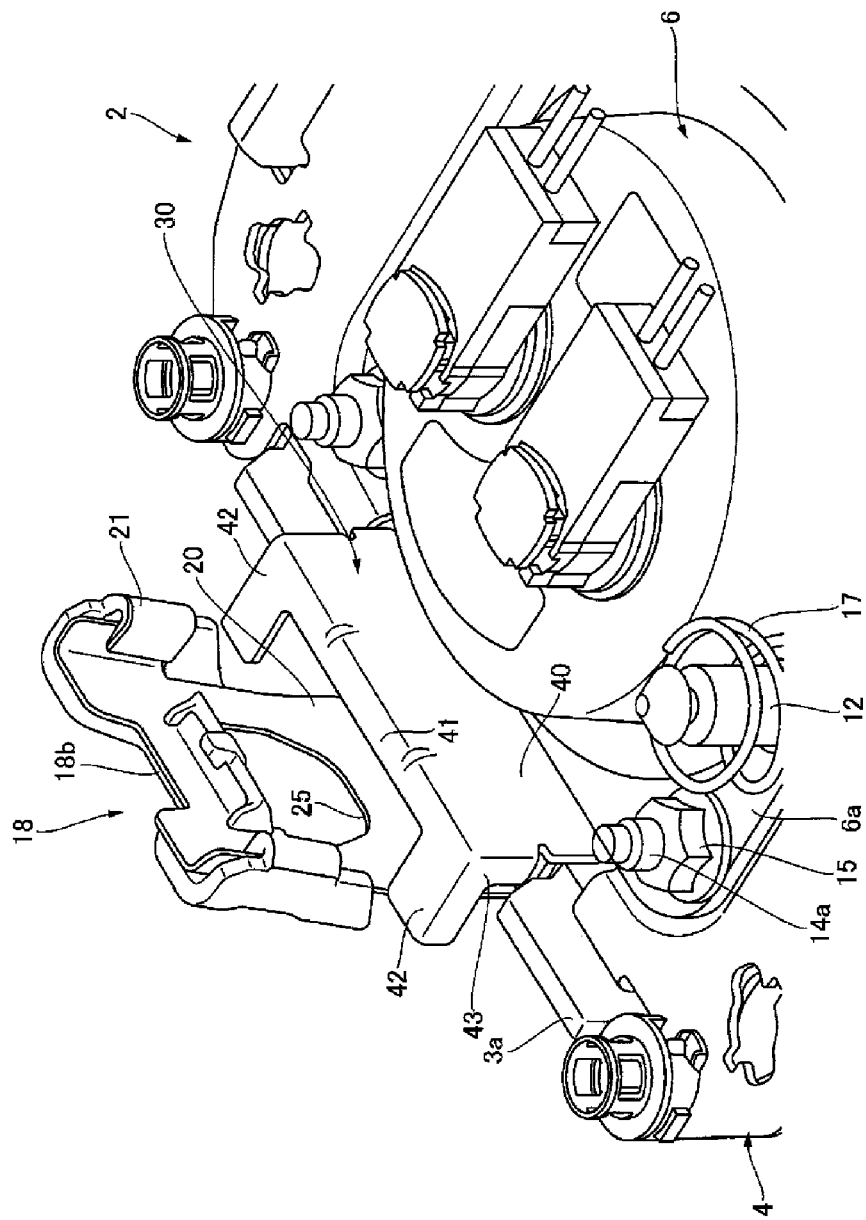
[FIG. 8]

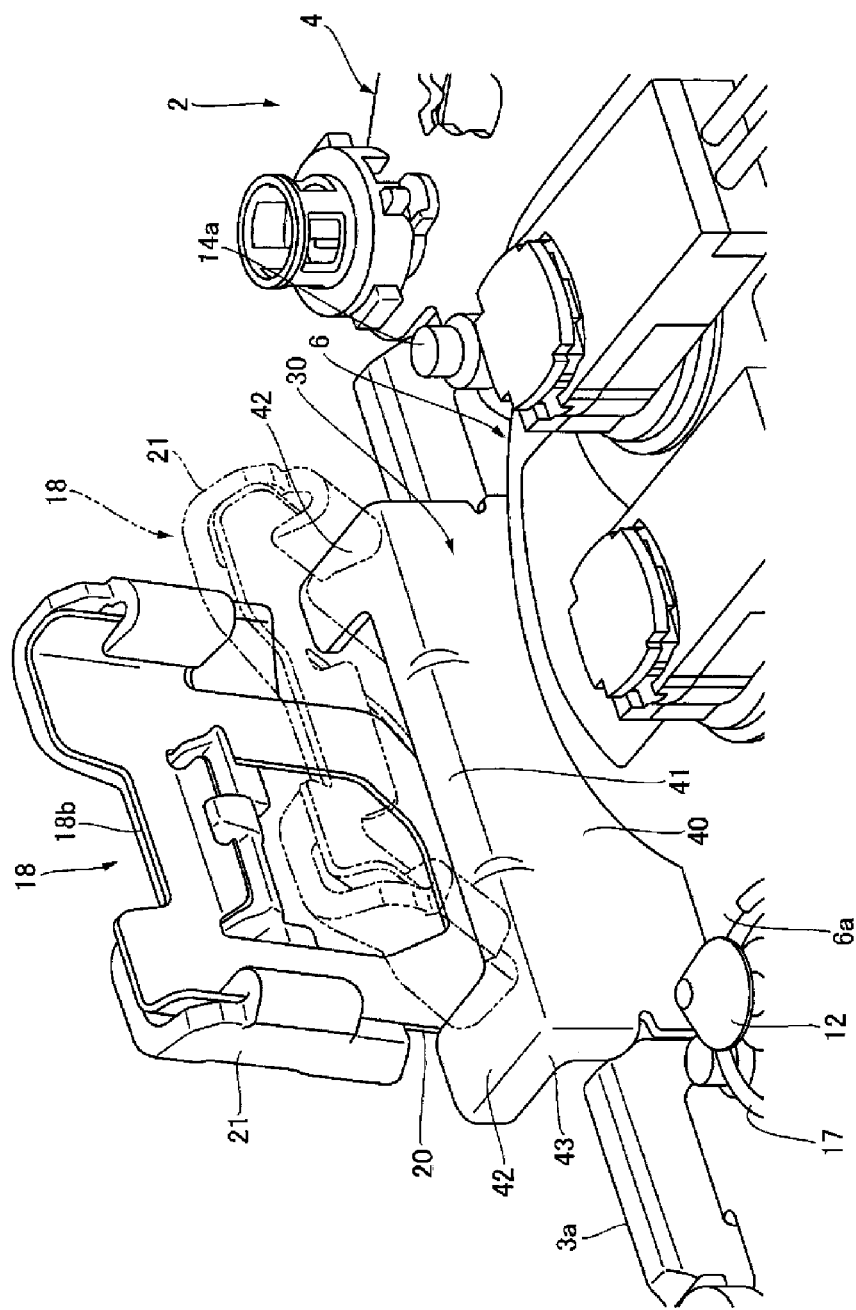
[FIG. 9]

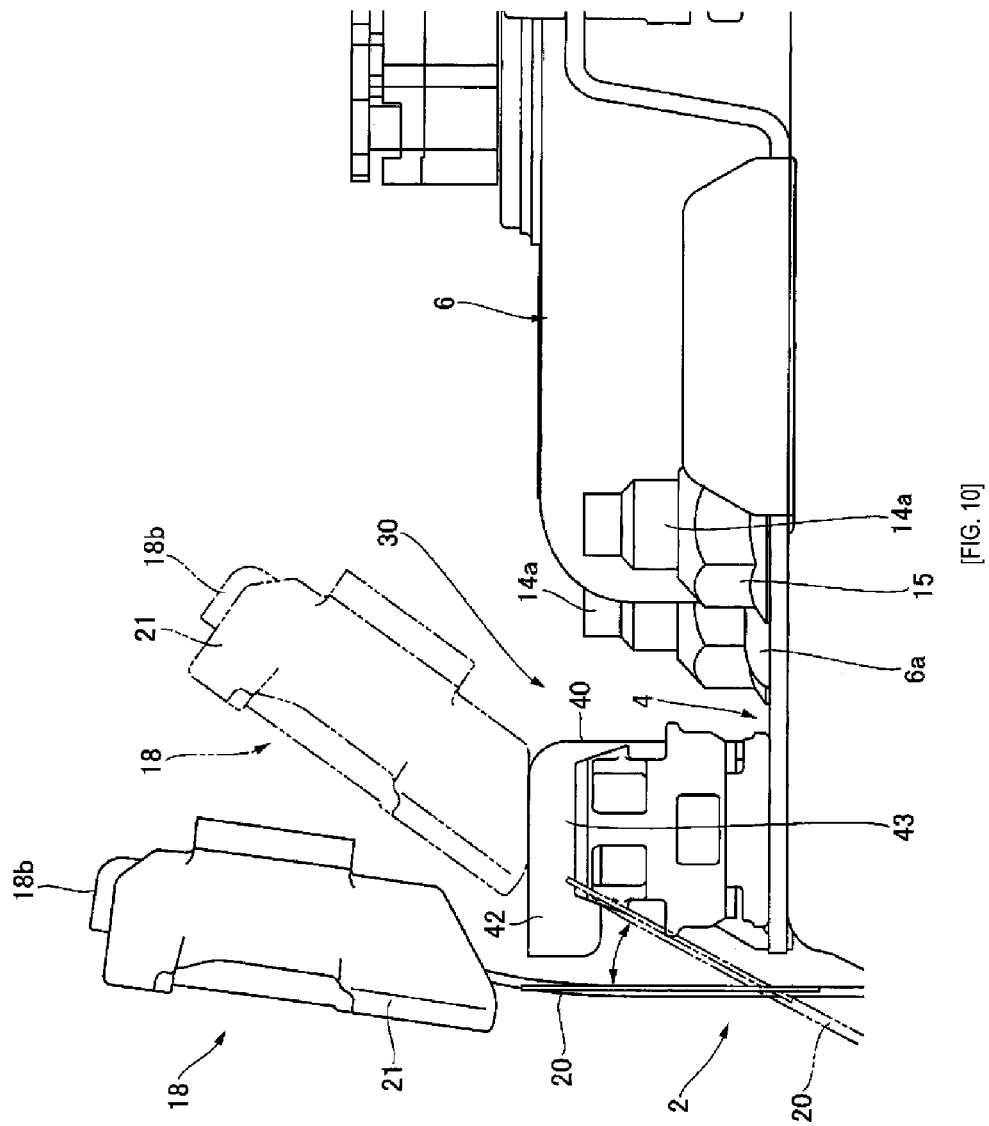
[FIG. 10]

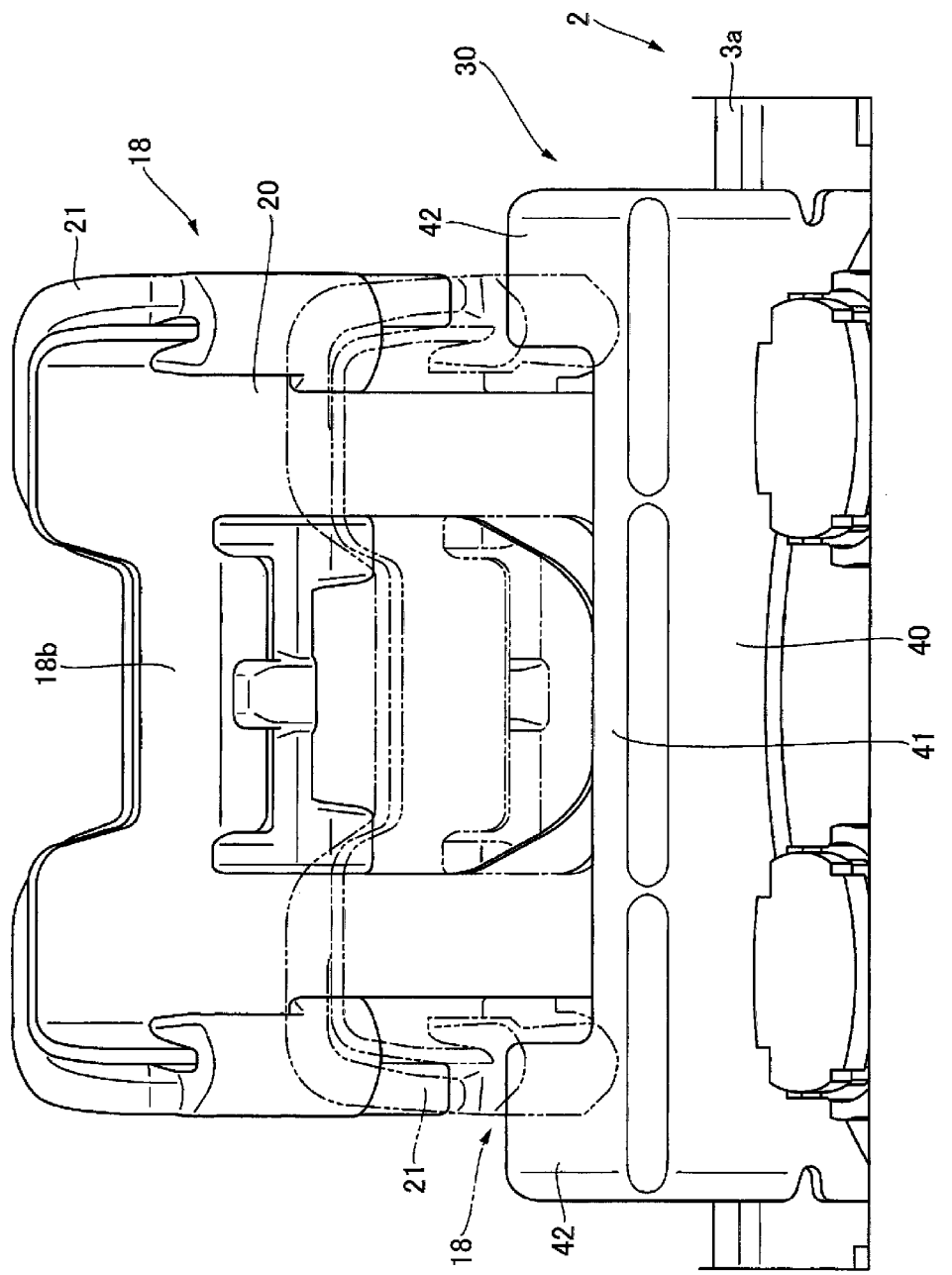
[FIG. 11]

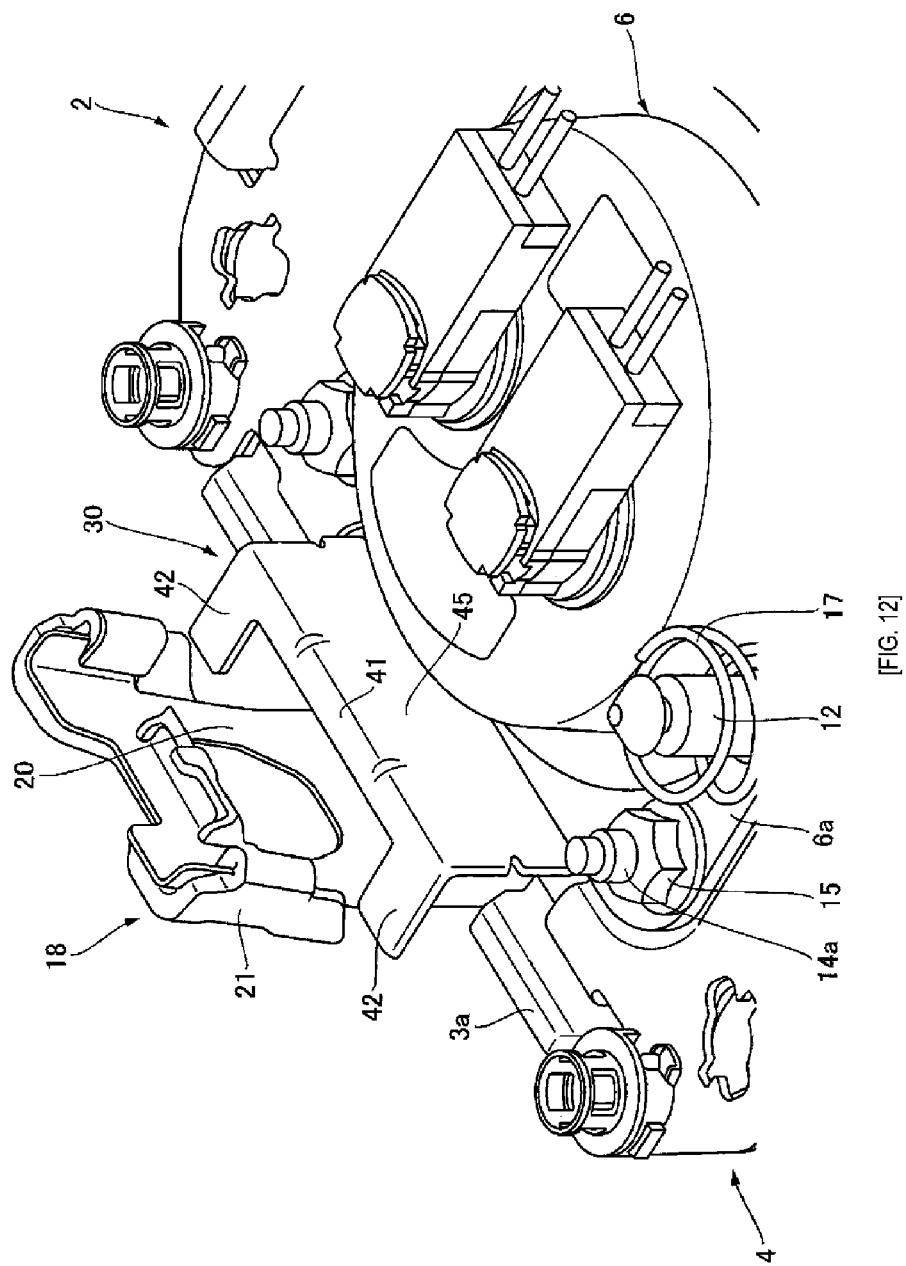
[FIG. 12]

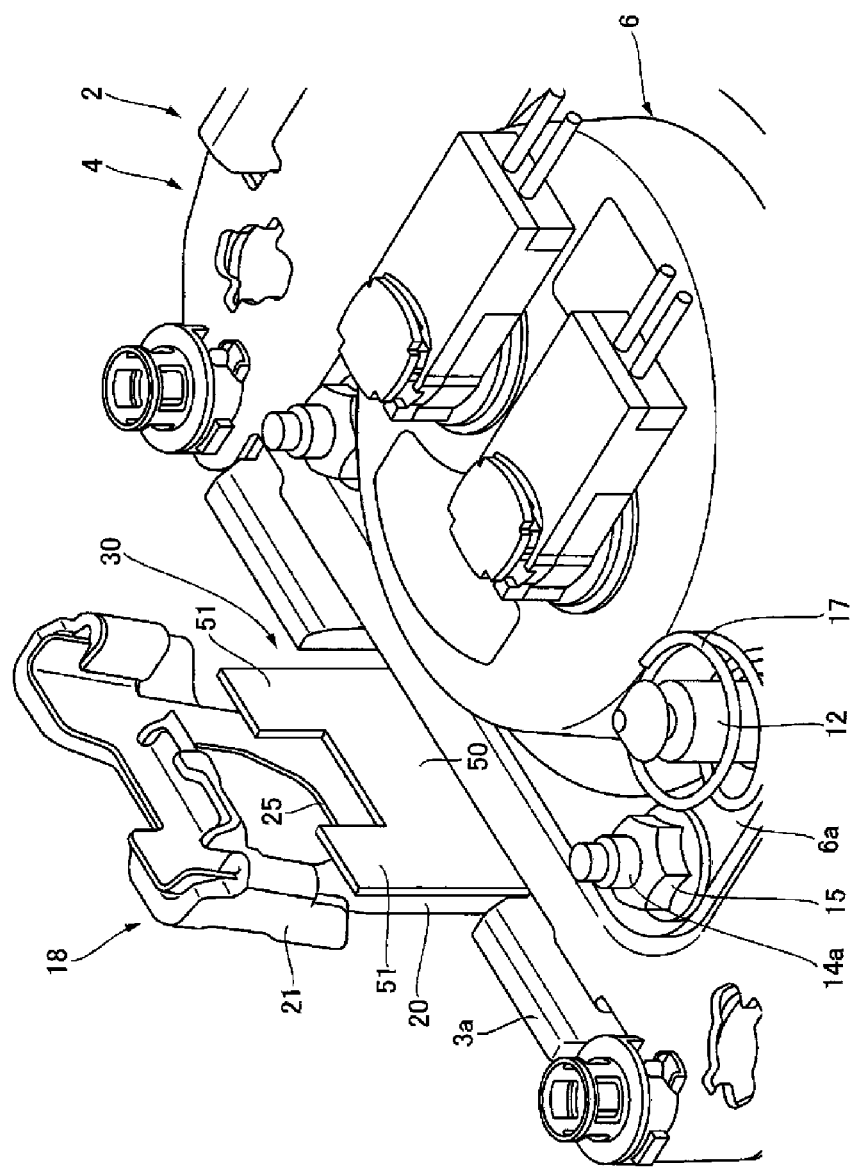
[FIG. 13]

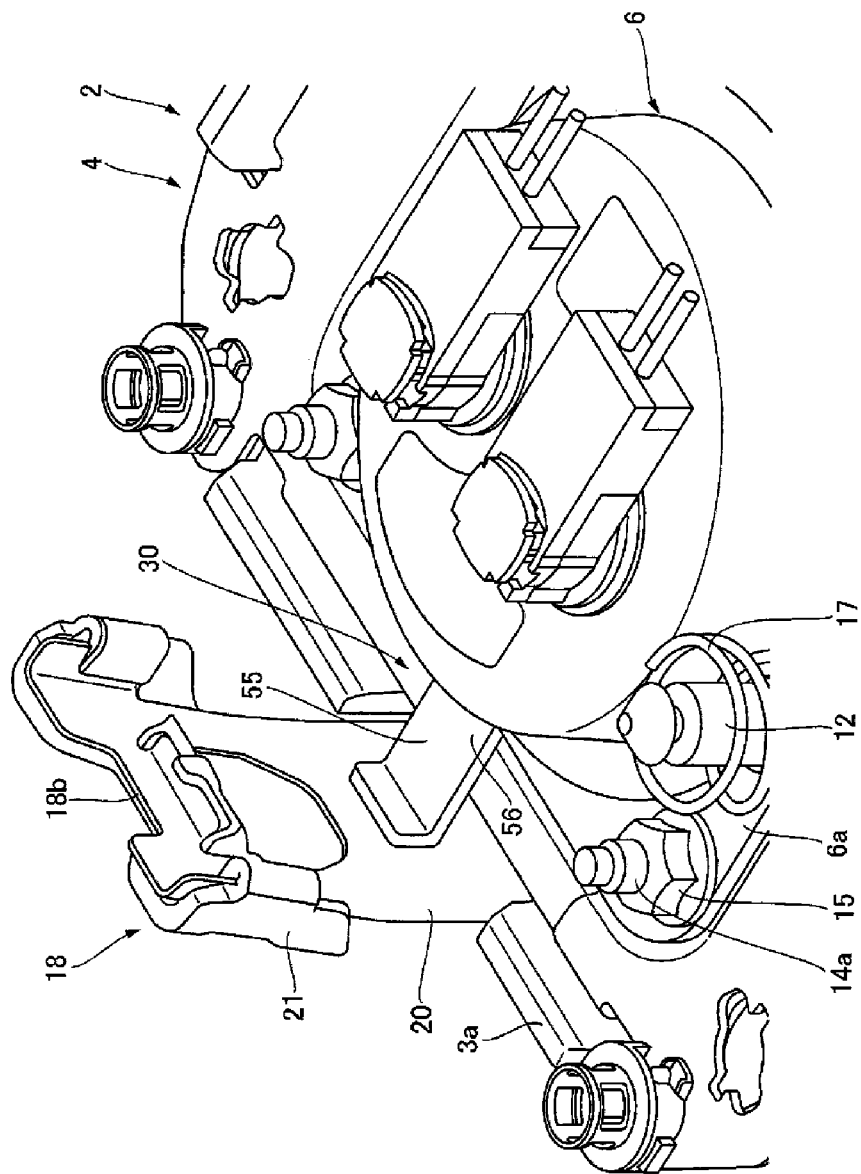
[FIG. 14]

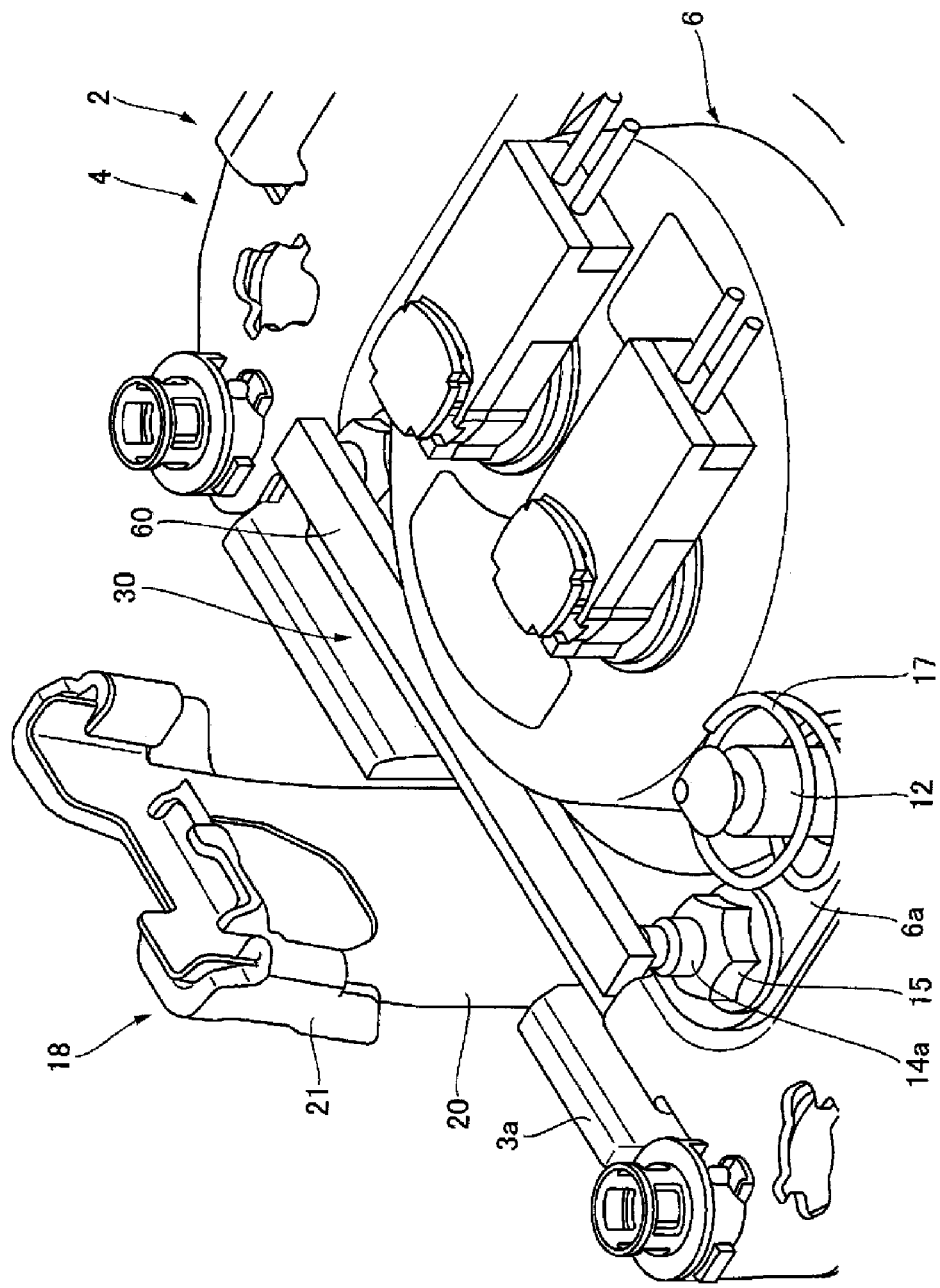
[FIG. 15]

[FIG. 16]
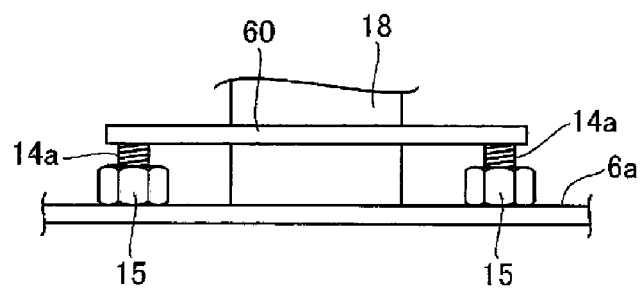

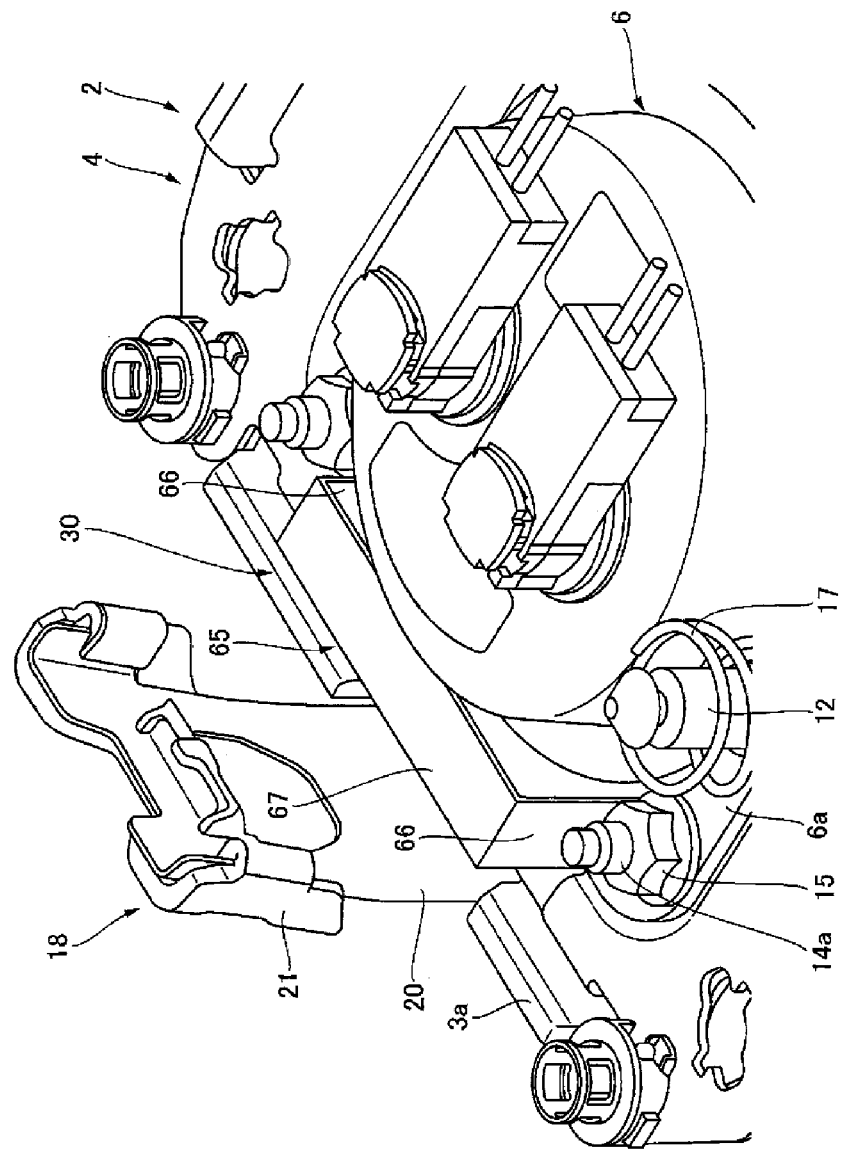
[FIG. 17]

[FIG. 18]
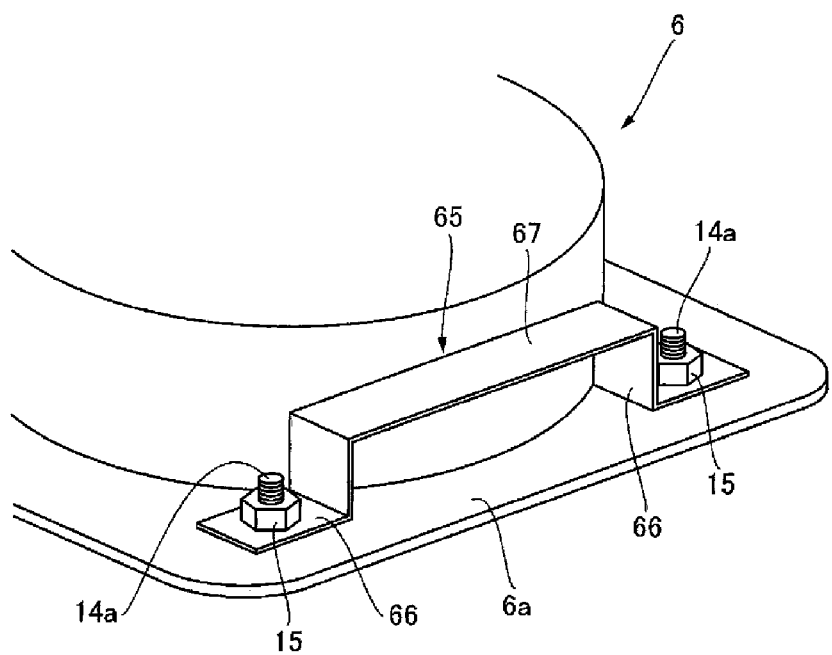

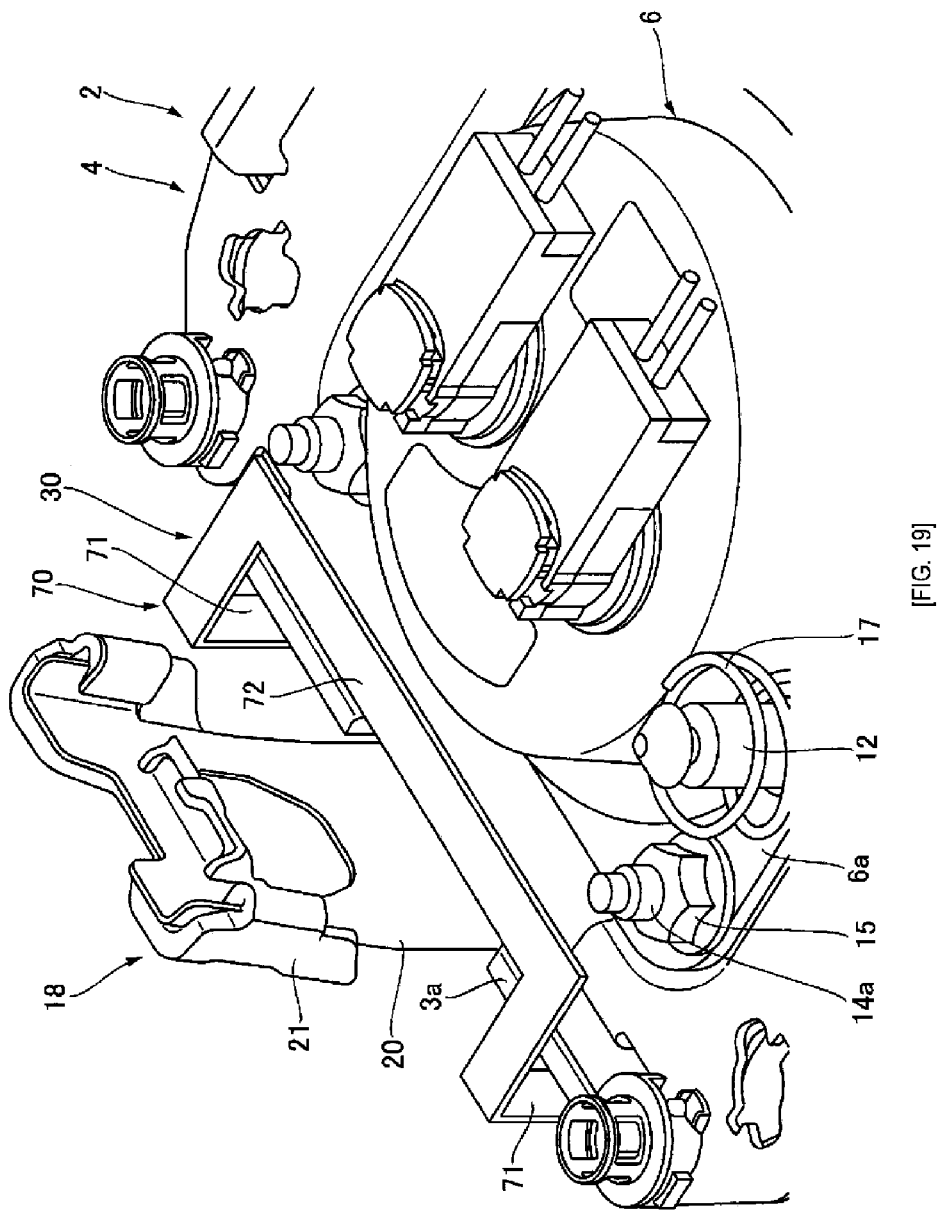
[FIG. 19]

[FIG. 20]
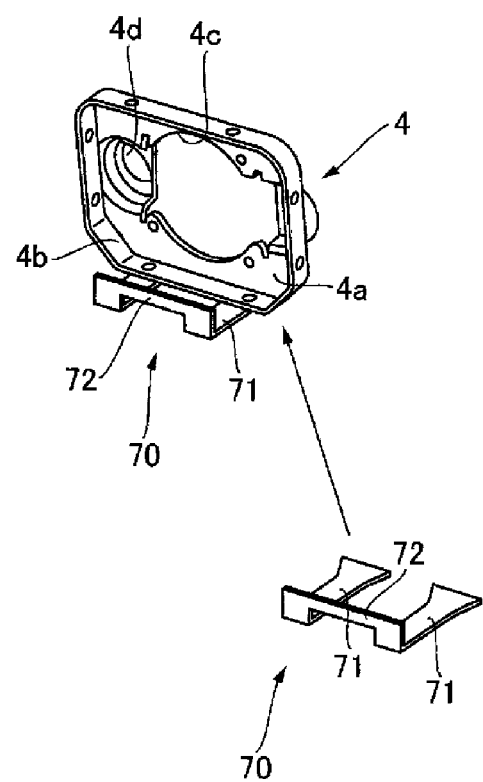

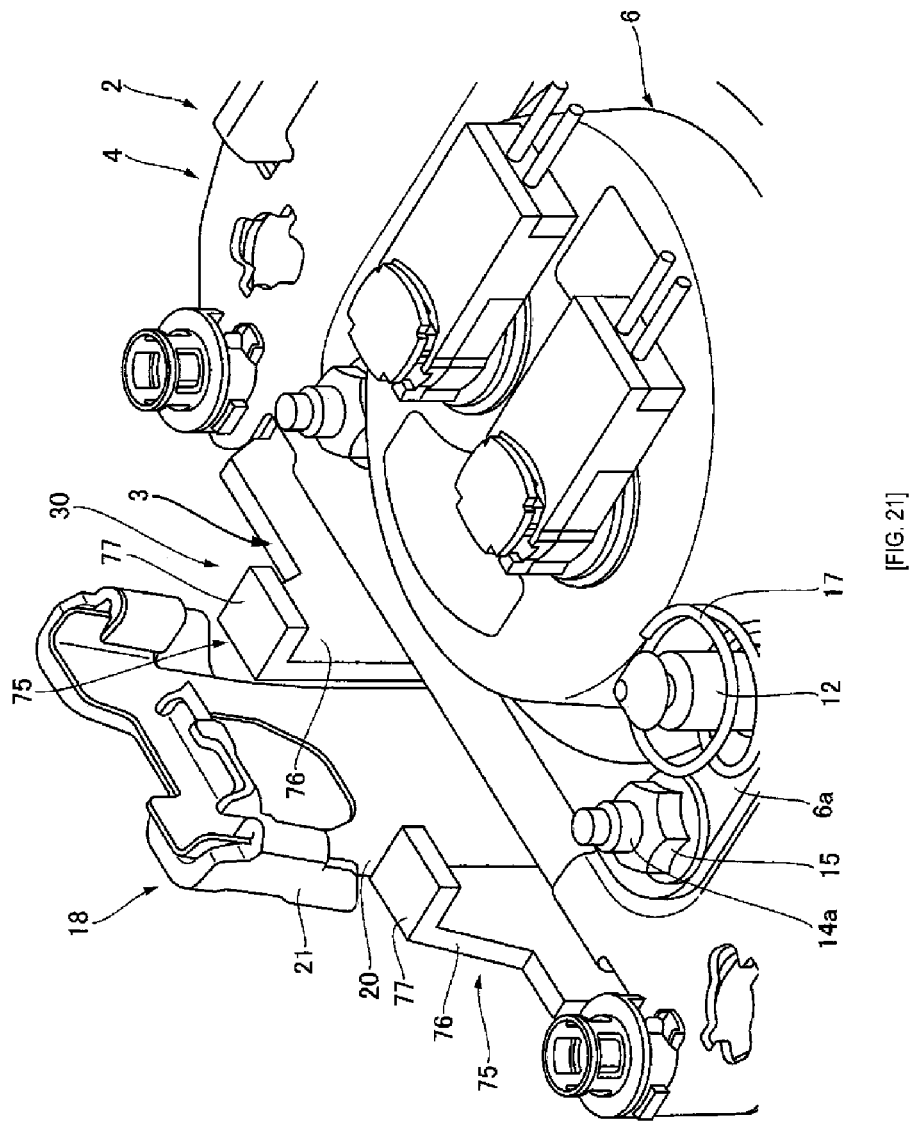
[FIG. 21]

[FIG. 22]
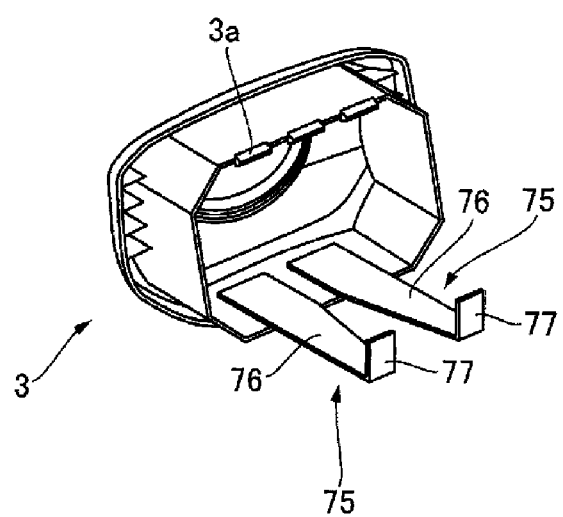

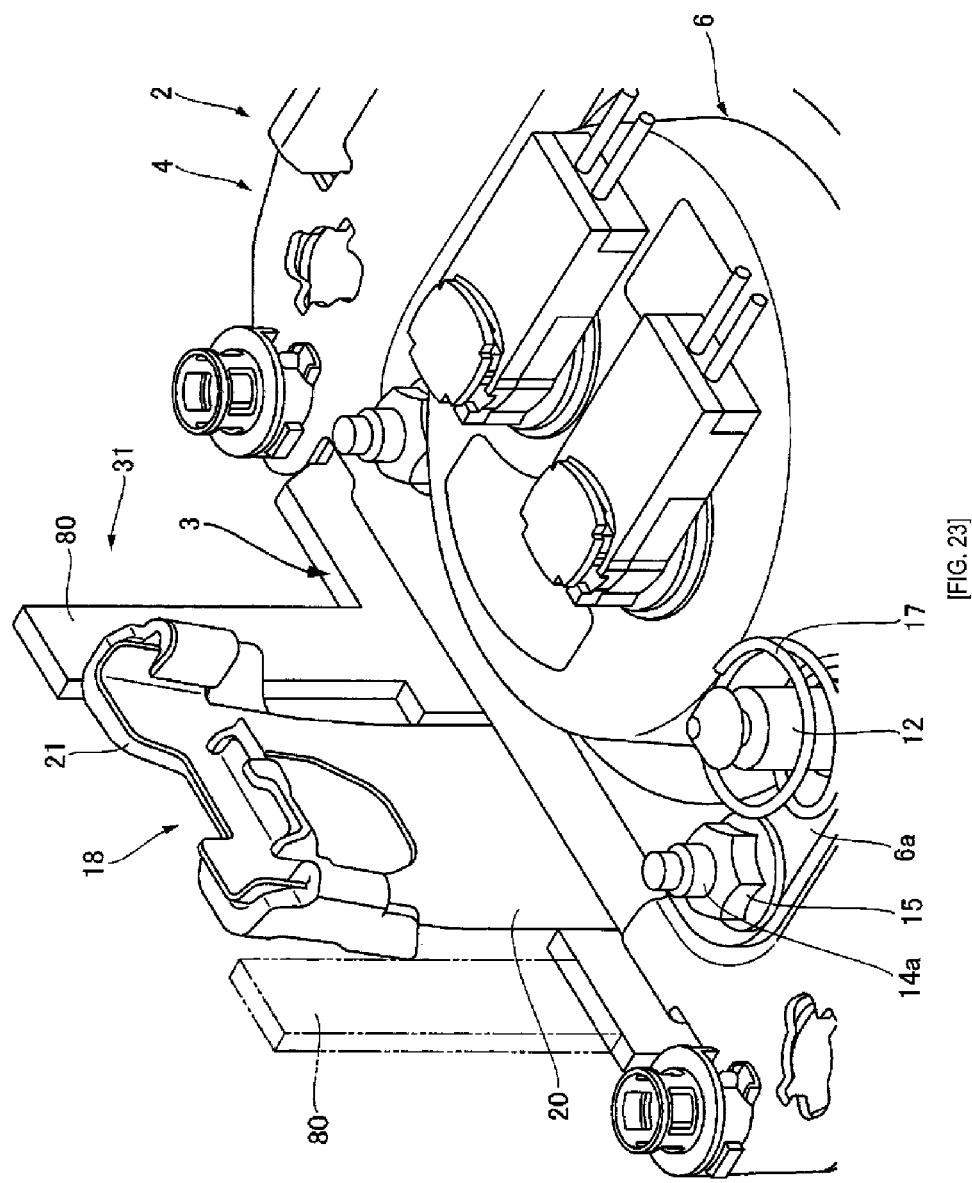
[FIG. 23]

[FIG. 24]
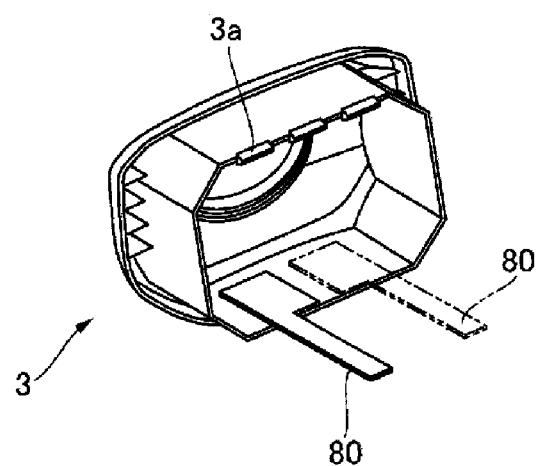

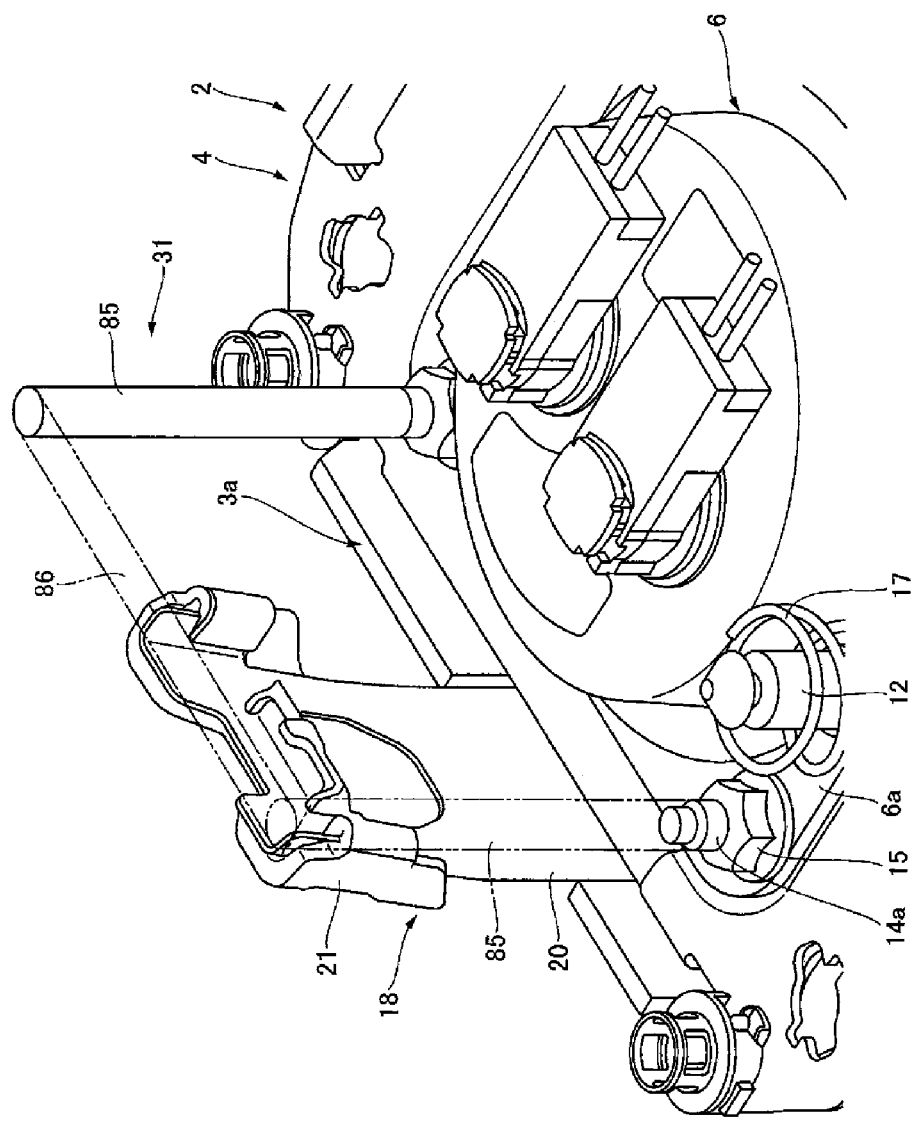
[FIG. 25]

[FIG. 26]
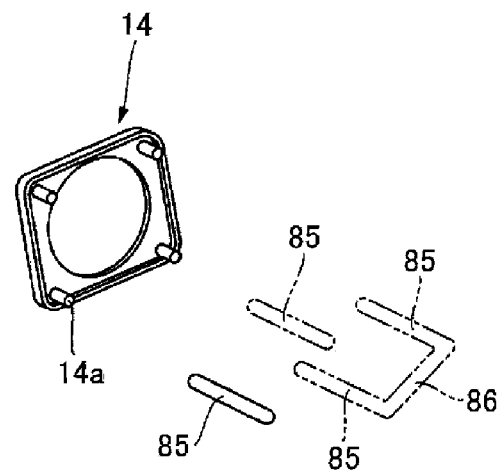

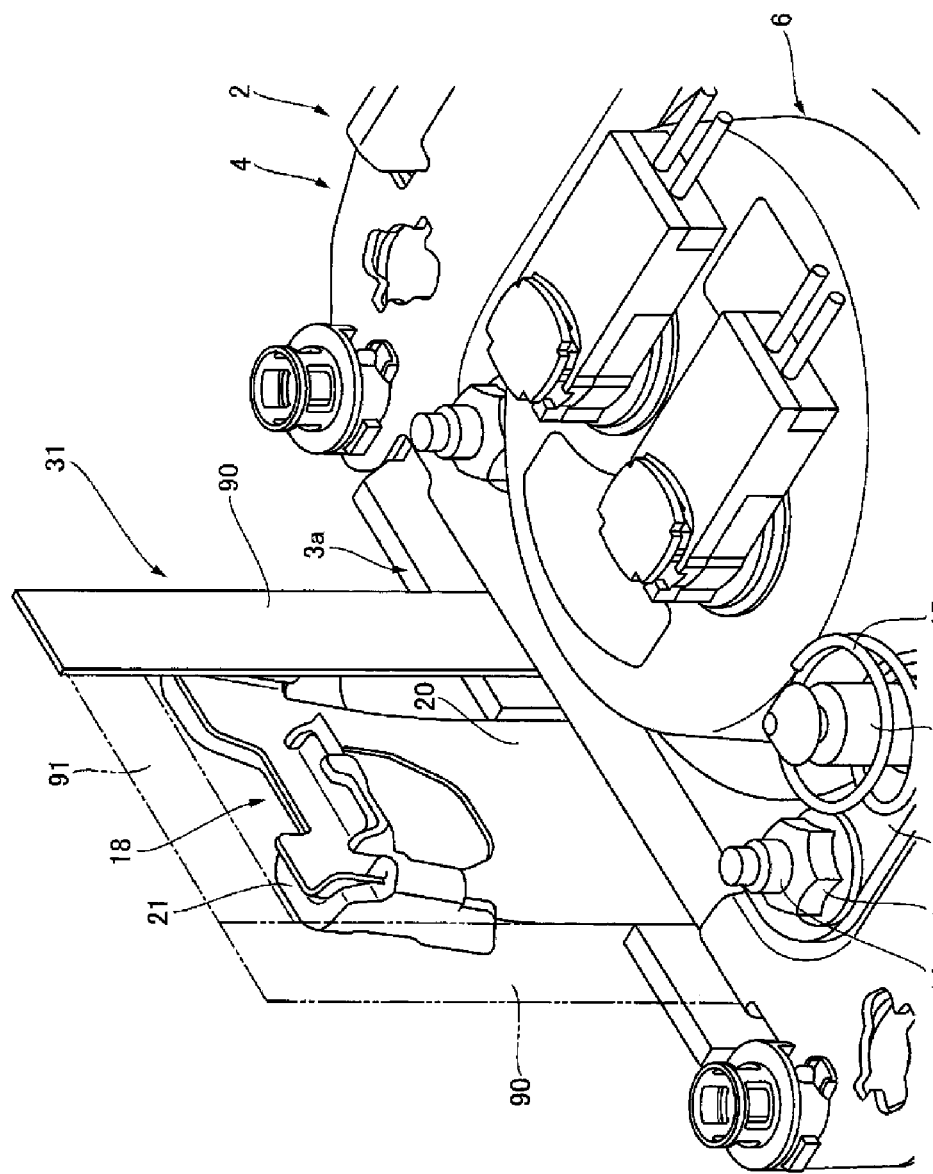
[FIG. 27]

[FIG. 28]
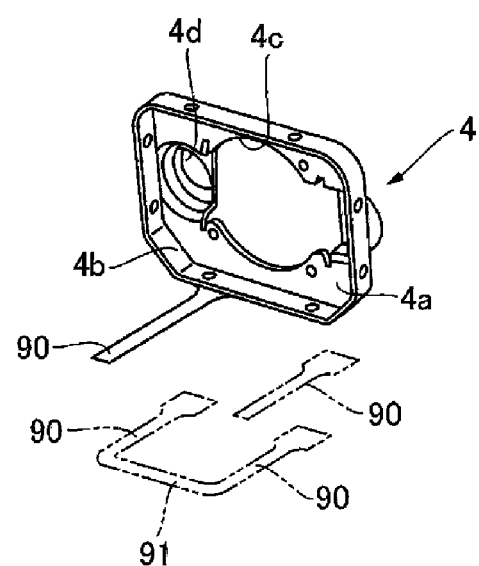

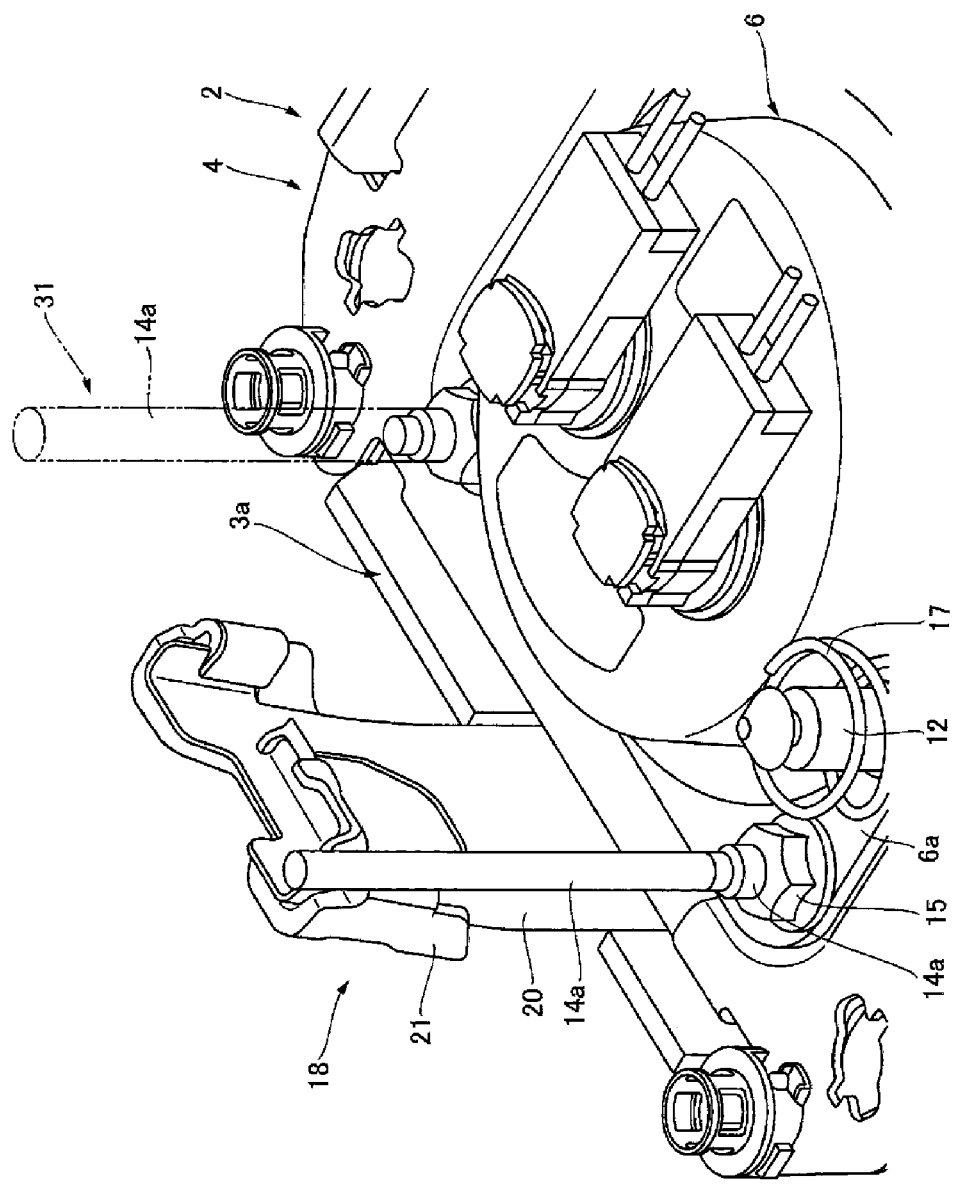
[FIG. 29]

DRIVER SEAT AIRBAG DEVICE

TECHNICAL FIELD

The present invention relates to a driver seat airbag device for an engagement mechanism that is installed in parallel with a damper unit and assembled to a steering wheel, and which enables appropriate protection of said engagement mechanism through completion of assembly and without causing any hindrance to the assembly to the steering wheel.

CONVENTIONAL TECHNOLOGY

Patent document 1 is known as a conventional technique of attaching an airbag module to a steering wheel by incorporating a damper unit between the steering wheel and the airbag module, which serves as a damper mass, to dampen the vibration of the steering wheel.

In the "steering wheel device" of Patent Document 1, the steering wheel is provided with a boss region, an airbag module installed in the boss region that also functions as a horn switch, a plurality of holes provided on the rear surface of the housing of the airbag module, a damper that joins the inner edge of the holes on the inner side, and rod shaped pins inserted into each of the holes with a first end that is joined with the damper installed in the holes and a second end that is connected to the boss region. Based on an elastic force, the damper between the boss region and the airbag module absorbs the vibration transmitted from the steering shaft when the vehicle is driving, and further, is designed to push back the airbag module after being released by the occupant during horn operation to an initial state of before being pushed by the occupant.

PRIOR ART DOCUMENTS

Patent Document

[Patent Document 1] Japanese Unexamined Patent Application 2015-71402

SUMMARY OF THE INVENTION

Problem to be Solved by the Invention

Each damper in the unit form is large because it has a cylindrical protector with large external dimensions into which the connecting pin is inserted. Therefore, installing a plurality of (at least three) dampers requires a large space, and the airbag modules in which the dampers were installed became larger.

To address this problem, it is conceivable to reduce the number of dampers in unit form for installation, and to develop a smaller, simpler, installation-specific engagement mechanism to compensate for this.

An engagement mechanism dedicated for installation should be provided in the airbag module, and this engagement mechanism should be used to assemble the airbag module to the steering wheel. In this case, the engagement mechanism is a protrusion protruding from the airbag module toward the steering wheel before the airbag module is attached to the steering wheel.

The engagement mechanism is not protected in any way simply by being installed in the airbag module.

If not protected, the engagement mechanism could be deformed by external forces unintentionally applied before assembly, for example, due to errors in assembly work or dropping the airbag module.

If the deformation to the engagement mechanism made it impossible to install the airbag module on the airbag module, that would be fine. However, if assembly were still to be possible in this situation, the damping performance would not be achieved as designed.

The present invention has been devised in light of the above-described conventional problems and is provided in parallel with the damper unit. An object of the present invention is to provide a driver seat airbag device that can appropriately protect an engagement mechanism assembled to a steering wheel without hindering assembly to the steering wheel through completion of the assembly.

Means for Solving the Problem

The driver seat airbag device according to the present invention includes:
  an airbag module provided with an airbag cushion and inflator for expanding and deploying the airbag cushion, and serving as a damper mass for a steering wheel;
  one or more damper units provided in between the airbag module and the steering wheel for damping vibration of the steering wheel;
  an engagement mechanism provided in the airbag module in parallel with the damper unit, for engaging with the steering wheel, and retaining the airbag module on the steering wheel while enabling relative displacement; and
  protecting means provided in the airbag module for stopping external forces to the engagement mechanism in a non-engaged state with the steering wheel, that may cause deformation, and thereby protecting the engagement mechanism.

The engagement mechanism is desirably formed to be elastically deformable extending from the airbag module to the steering wheel side, and includes a hook on the extending tip end side that engages with the steering wheel, and
  the protecting means is desirably provided in parallel with the engagement mechanism on the extending base side opposite to the extending tip end side and in the vicinity of the engagement mechanism so as to suppress deformation of the engagement mechanism that may occur due to external forces.

The protecting means is preferably provided in the airbag module so as to be positioned in a region between the inflator and the engagement mechanism.

The protecting means is preferably a wall body provided in the region described above and having a wall surface along the extending direction of the engagement mechanism.

The airbag module preferably has a housing for mounting parts, and the wall body is formed integrally in the housing.

The protecting means is preferably ribs provided in the above region, protruding from the engagement mechanism toward the inflator, and can come in contact with the inflator.

The protecting means is preferably provided in the region described above, and is configured of a crossbeam part extending in a direction intersecting the extending direction of the engagement mechanism so that the engagement mechanism can come into contact thereon, and a supporting leg part supporting the crossbeam part.

The airbag module preferably has a pad cover forming a design surface, and the protecting means is integrally formed with the pad cover and extends to the region described above.

The engagement mechanism is preferably formed to be elastically deformable extending from the airbag module to the steering wheel side, and includes a hook on the extending tip end side that engages with the steering wheel, and the protecting means is preferably provided in parallel with the engagement mechanism in at least one location in the vicinity of the engagement mechanism and protruding more toward the steering wheel side than the extending tip end of the engagement mechanism.

The airbag module preferably has a pad cover forming a design surface, and the protecting means is integrally formed with the pad cover.

The airbag module preferably has a retainer, the retainer has a bolt for mounting the inflator to the airbag module, and the protecting means is a sleeve provided on the bolt.

The airbag module preferably has a retainer, the retainer has a bolt for mounting the inflator to the airbag module, and the protecting means is an extension of the bolt.

The airbag module preferably has a housing for mounting parts, and the protecting means is a board provided in the housing.

The protecting means is preferably provided on both sides of the engagement mechanism so as to sandwich the engagement mechanism.

Two protecting means are preferably provided, positioned on both sides of the engagement mechanism, and a crossbeam part is provided in between the plurality of protecting means in a direction intersecting the extending direction of the engagement mechanism in a manner where the engagement mechanism can come into contact thereon.

Effect of the Invention

The driver seat airbag device of the present invention is designed for an engagement mechanism that is installed in parallel with the damper unit and assembled to the steering wheel, and can appropriately protect said engagement mechanism through completion of assembly to the steering wheel without causing any hindrance to the assembly to the steering wheel.

BRIEF DESCRIPTION OF THE DRAWINGS

FIG. 1 is an overall perspective view depicting an overview of the steering wheel to which the driver seat airbag device of the present invention is applied.

FIG. 2 is a side cross section view depicting an overview of the steering wheel in FIG. 1.

FIG. 3 is an exploded perspective view of the airbag module mounted on the steering wheel in FIG. 1, together with a damper unit and engagement mechanism incorporated in the airbag module.

FIG. 4 is a perspective view of the airbag module in FIG. 3.

FIG. 5 is a side view of the airbag module in FIG. 4, depicting the area around the damper unit and engagement mechanism (protecting means not shown).

FIG. 6 is a perspective view of the engagement mechanism of the airbag module in FIG. 4, by itself.

FIG. 7 is a schematic side view depicting the engagement mechanism of the airbag module in FIG. 4 engaged and assembled to the steering wheel.

FIG. 8 is a perspective view for describing Embodiment 1 of the protecting means provided in the airbag module in FIG. 4.

FIG. 9 is a perspective view for describing the action of the protecting means depicted in FIG. 8.

FIG. 10 is a side view of FIG. 9.

FIG. 11 is a front view of FIG. 9.

FIG. 12 is a perspective view for describing Embodiment 2 of the protecting means provided in the airbag module in FIG. 4.

FIG. 13 is a perspective view for describing Embodiment 3 of the protecting means provided in the airbag module in FIG. 4.

FIG. 14 is a perspective view for describing Embodiment 4 of the protecting means provided in the airbag module in FIG. 4.

FIG. 15 is a perspective view for describing Embodiment 5 of the protecting means provided in the airbag module in FIG. 4.

FIG. 16 is an exploded view of the key part of the protecting means in FIG. 15.

FIG. 17 is a perspective view for describing Embodiment 6 of the protecting means provided in the airbag module in FIG. 4.

FIG. 18 is an exploded view of the key part of the protecting means in FIG. 17.

FIG. 19 is a perspective view for describing Embodiment 7 of the protecting means provided in the airbag module in FIG. 4.

FIG. 20 is an explanatory diagram for explaining the protecting means in FIG. 19.

FIG. 21 is a perspective view for describing Embodiment 8 of the protecting means provided in the airbag module in FIG. 4.

FIG. 22 is an exploded view of the key part of the protecting means in FIG. 20.

FIG. 23 is a perspective view for describing Embodiment 1 of another protecting means provided in the airbag module in FIG. 4.

FIG. 24 is an exploded view of the key part of the protecting means in FIG. 23.

FIG. 25 is a perspective view for describing Embodiment 2 of another protecting means provided in the airbag module in FIG. 4.

FIG. 26 is an explanatory diagram for explaining the protecting means in FIG. 25.

FIG. 27 is a perspective view for describing Embodiment 3 of another protecting means provided in the airbag module in FIG. 4.

FIG. 28 is an explanatory diagram for explaining the protecting means in FIG. 27.

FIG. 29 is a perspective view for describing Embodiment 4 of another protecting means provided in the airbag module in FIG. 4.

EMBODIMENTS OF THE INVENTION

One preferred embodiment of a driver seat airbag device according to the present invention will hereinafter be described in detail with reference to the accompanying drawings.

FIG. 1 and FIG. 2 are diagrams depicting an outline of a steering wheel to which a driver seat airbag device according to the present invention is applied. FIG. 3 is an exploded perspective view of the airbag module mounted on the steering wheel in FIG. 1, together with a damper unit and engagement mechanism incorporated in the airbag module. FIG. 4 is a perspective view of the airbag module in FIG. 3. FIG. 5 is a side view of the area surrounding the damper unit and the engagement mechanism (protecting means omitted). FIG. 6 is a perspective view of the engagement mechanism of the airbag module, alone. FIG. 7 is a schematic side view depicting how the engagement mechanism of the airbag module is engaged with and assembled to the steering wheel.

FIG. 1 is a perspective view of the entire steering wheel 1. FIG. 2 is a side cross section view of the steering wheel. In the following drawings, including in FIG. 1, each direction is illustrated assuming that the steering position of the steering wheel 1 mounted on the vehicle is in a neutral position. For example, for the Z-axis, the direction towards the vehicle front wheels of the steering column (steering shaft, not illustrated) is down and the direction toward the steering wheel 1 is up.

In the plane perpendicular to the Z-axis, the 12 o'clock position of an analog 12-hour clock is the front side of the vehicle, and the X-axis is from 9 o'clock (left direction) to 3 o'clock (right direction) and the Y-axis is from 6 o'clock (rear direction) to 12 o'clock (front direction). Alternatively, a view viewing the driver is referred to as a front side, and the opposite side thereof is referred to as a back side.

The steering wheel 1 is installed in the driver seat of the vehicle. The steering wheel 1 is connected to a steering shaft that passes through the interior of the steering column (not shown) and transmits the driver operating force to the steering gear and the like.

An airbag module 2 that functions as a front airbag in an emergency is mounted in the center of the steering wheel 1. Although the description is omitted, the airbag module 2 also functions as a horn switch that a driver pushes when sounding a horn, during normal times.

The driver side of the airbag module 2 is covered by a plastic pad cover 3 that forms a design surface. A dish-shaped housing 4 is provided behind the pad cover 3. The airbag cushion 5 is folded and stowed inside the pad cover 3. The airbag cushion 5 is deployed and expanded in an emergency. An inflator 6 is attached to the housing 4. The inflator 6 is stowed in the airbag cushion 5.

When a signal is sent from the vehicle sensors during an emergency, inflator gas is supplied from inflator 6 to the airbag cushion 5. The airbag cushion 5, supplied with inflator gas, expands and deploys into the cabin space to restrain the driver by opening the pad cover 3. Thus, the airbag module 2 is equipped with an airbag cushion 5 and an inflator 6 that expands and deploys the airbag cushion 5.

In the following description, examples are given of preferred materials for the various components, for example, metal and synthetic resin. However, the materials illustrated in the description are merely examples. The various components can, of course, be made of other materials than those described in the examples.

A base part of the steering wheel 1 is configured of a metal cored bar member 7. The cored bar member 7 roughly comprises a central boss region 8, a circular rim 9 that is grasped by the driver, and spokes 10 that connect the boss region 8 and rim 9. A steering shaft is connected to the boss region 8.

In addition to the function thereof as a front airbag, the airbag module 2 of the driver seat airbag device according to the present embodiment has a function as a horn switch, as described above, and also as a module damper mechanism that dampens vibration.

First, a brief description of the components that achieve these functions as a horn switch and module damper mechanism is given with reference to FIG. 3 to FIG. 5.

The airbag module 2 includes the following. The airbag module 2 is provided with a metal housing 4. The housing 4 is dish-shaped with a peripheral wall 4b around the bottom surface that serves as the inflator mounting surface 4a. The housing 4 has a central inflator insertion hole 4c and two damper unit mounting through-holes 4d on both sides. Two damper units 11 are mounted in the two through-holes 4d.

The damper unit 11 is protected by a sleeve-shaped protector 11a. The damper unit 11 is provided with a slidable metal pin 12. The pin 12 is inserted into the damper unit 11 from the housing 4 toward the boss region 8. The inflator 6 is mounted on the housing 4. The inflator 6 is inserted into the inflator insertion hole 4c from the opposite side of the peripheral wall 4b of the housing 4 (cored bar member 7 side). An outer flange 6a of the inflator 6 is in contact with the inflator mounting surface 4a of the housing 4. A metal attachment plate 13 is stowed in the housing 4. The attachment plate 13 is installed facing the pin 12 from the peripheral wall 4b side of the housing 4. The airbag module 2 is equipped with a metal retainer ring 14. The retainer ring 14 has bolts 14a. The retainer ring 14 is superimposed on the attachment plate 13 from the peripheral wall 4b side of the housing 4. The retainer ring 14 secures the inflator 6 and the like to the housing 4 by means of bolts 14a that pass through the attachment plate 13, inflator mounting surface 4a of the housing 4, and outer flange 6a of the inflator 6, and are fastened with a nut 15. The airbag module 2 is further equipped with a horn cover 3 made of plastic, such as synthetic resin. The horn cover 3 is provided on the housing 4, covering the inflator 6 and other parts from the opposite side of the bottom of the inflator mounting surface 4a. The horn cover 3 is fastened to a slit 13a of the attachment plate 13 by a plurality of locking hooks 3a on the periphery of the opening. The horn cover 3 accommodates the airbag cushion 5 therein. The airbag module 2 is composed of the above members.

The pin 12 protruding from the inflator mounting surface (bottom) 4a of the housing 4 is surrounded by a horn spring (coil spring) 17.

The housing 4 is provided with one engagement mechanism 18 in parallel with the pin 12 inserted in the damper unit 11 and the horn spring 17 that surrounds the pin 12. The engagement mechanism 18 is described below.

Two metal coil springs 19 are provided as elastic support members between the cored bar member 7 and the airbag module 2 (housing 4), as depicted in FIG. 3 to FIG. 5. The coil springs 19 are positioned between the engagement mechanism 18 from both sides along the X-axis direction.

The airbag module 2 has one or more (two in the diagram) damper units 11 in the housing 4, as depicted in FIG. 3 and FIG. 4. The housing 4 is provided with an engagement mechanism 18. The damper unit 11 and the engagement mechanism 18 are functional components that elastically attach the airbag module 2 (housing 4) to the cored bar member 7.

The two damper units 11 are located in the center of the airbag module 2 (housing 4) in the vertical direction (Y-axis direction) with respect to the neutral position of the steering wheel 1, as depicted in FIG. 4.

The damper unit 11 is positioned on the left and right sides of the airbag module 2 (housing 4) in the left-right direction (X-axis direction) with respect to the neutral position of the steering wheel 1. Preferably, the two damper units 11 are located equidistant from the central axis of the airbag module 2 (housing 4) in the left-right direction.

A bar-shaped pin 12 protrudes from the damper unit 11 in the Z-axis direction toward the boss region 8 of the cored bar member 7 (see FIG. 2 and FIG. 4). The pin 12 is fixed to the cored bar member 7, and thereby the steering wheel 1 and the airbag module 2 are connected to each other. A damper unit 11 is placed between the airbag module 2 and the steering wheel 1 to suppress vibration of the steering wheel 1.

As depicted in FIG. 4, the pin 12 is inserted into the cored bar member 7 through the coil-shaped horn spring 17. The horn spring 17 is installed between the airbag module 2 and the cored bar member 7 to ensure a gap therebetween. During horn operation, when the horn is released from pressing by the driver (see arrow B in FIG. 2 and FIG. 4), the horn spring 17 moves the airbag module 2 away from the cored bar member 7 and returns the airbag module 2 to the original position of the airbag module.

The damper unit 11, in brief, includes an annular elastic body for damping vibration, a sleeve-shaped synthetic resin protector 11a that covers and holds the elastic body, and a pin 12 that is slidably inserted inside the elastic body.

The protector 11a is mounted in a through-hole 4d formed in the housing 4 that constitutes the airbag module 2. The damper unit 11 is thus secured to the airbag module 2.

The airbag module 2 is elastically supported against the steering wheel 1 by the damper unit 11, which is equipped with an elastic body. The airbag module 2 is installed in a freely slidable manner toward the steering wheel 1 via the pin 12.

The vibration of the steering wheel 1 is transmitted to the damper unit 11 via the pin 12. The transmitted vibration is damped in the damper unit 11 with the airbag module 2 as the damper mass.

The horn function is described as follows. When the airbag module 2 is pushed so as to advance toward the steering wheel 1, the damper unit 11 provided on the airbag module 2 slides against the pin 12. This sliding movement compresses the horn spring 17. Contact points (not shown) provided respectively on the airbag module 2 and steering wheel 1 conduct electricity, causing the horn to sound.

When the pressure on the airbag module 2 is released, the horn spring 17 is elastically restored. When the horn spring 17 is elastically restored, the airbag module 2 moves back. This causes the contacts to separate and sounding of the horn is stopped.

As depicted in FIG. 2 to FIG. 4, the engagement mechanism 18 is provided between the cored bar member 7 of the steering wheel 1 and the housing 4 of the airbag module 2, which serves as the damper mass, to hold the steering wheel 1 and the airbag module 2 enabling the relative displacement thereof. The engagement mechanism 18 is provided in parallel with the damper unit 11.

In the present embodiment, the engagement mechanism 18 is provided joined to the airbag module 2. The engagement mechanism 18 is engaged with the steering wheel 1. The engagement mechanism 18 enables relative displacement of these airbag modules 2 and steering wheel 1 in the engaged state.

Relative displacement is, in detail, the variation in the separation distance between the steering wheel 1 and the airbag module 2 due to vibration of the steering wheel 1 and damping by the damper unit 11. The engagement mechanism 18 allows this distance to vary.

As depicted in FIG. 4, the engagement mechanism 18 is positioned in the lower side of the steering wheel 1 in the vertical direction (Y-axis direction) based on the neutral position of the steering wheel 1. In relation to the damper units 11, the engagement mechanism 18 is arranged in the center between the two damper units 11, lower (6 o'clock side) than these damper units 11.

Therefore, the damper units 11 and the engagement mechanism 18 are provided at each vertex of an inverted isosceles triangle with respect to the airbag module 2. The two coil springs 19 described above are located on both the left and right sides of the engagement mechanism 18 along the X-axis direction.

The engagement mechanism 18 is composed of primarily a plate spring (made of metal or synthetic resin) 20 that extends from the housing 4 of the airbag module 2 toward the steering wheel 1 side, as depicted in FIG. 6. The engagement mechanism 18 includes an elastic piece 21, and a hook that engages with the steering wheel 1, attached to the extending tip end side of the plate spring 20.

Since the engagement mechanism 18 is mainly composed of the elastically deformable plate spring 20, it does not interfere with the damping action of the damper unit 11, which damps the vibration of the steering wheel 1 with the airbag module 2 as the damper mass.

The plate spring 20 of the engagement mechanism 18 may be made of metal, such as steel or stainless steel, or may be formed by resin molding with synthetic resin material. Preferred synthetic resin materials are 66 nylon, glass-blended 66 nylon, polypropylene (PP), and polyacetal (POM).

In the state depicted in FIG. 6, the joint part 18a of the engagement mechanism 18 is the extending base side opposite to the extending tip end side along the vertical length direction (Z-axis direction). The joint part 18a is joined to the housing 4 of the airbag module 2 by rivets or other means. On the other hand, the extending tip end of the engagement mechanism 18 is the engaging part 18b for the steering wheel 1.

An elastic piece 21, which serves as a hook, is attached to the engaging part 18b. The elastic piece 21 is engaged with the locking part 22 (see FIG. 7) formed in the cored bar member 7 of the steering wheel 1.

In further detail, as depicted in FIG. 6, a small hole 24 for riveting is formed in the joint part 18a of the engagement mechanism 18. This joint part 18a is joined to the peripheral wall 4b of the housing 4.

A pair of engaging parts 18b is formed on both edges of the plate face of the plate spring 20 in the width direction. The engaging part 18b is formed by forming a bend toward either side of the plate spring 20 in the plate thickness direction.

A window 25 is formed between the joint part 18a and the engaging part 18b. The elastic piece 21 is provided, via the window 25, surrounding the engaging part 18b so that it becomes the outer skin of the engaging part 18b.

The engagement mechanism 18 can be deformed by the elasticity of the plate spring 20, enabling the plate to be bent between the engaging part 18b and the joint part 18a in a restorable manner. This elastic deformation allows the engaging part 18b of the engagement mechanism 18 to smoothly engage the locking part 22 of the steering wheel 1.

The elastic piece 21 is formed of a rubber material such as ethylene propylene diene rubber (EPDM), silicon rubber, nitrile rubber (NBR), or synthetic resin material such as 66 nylon, glass-blended 66 nylon, polypropylene (PP), polyacetal (POM), and the like.

The engagement action of the engagement mechanism 18 on the locking part 22 is described below. The plate spring 20 of the engagement mechanism 18 is elastically deformable with regards to the joint part 18a joined to the housing 4.

As depicted in FIG. 7, the locking part 22 of the steering wheel 1 comprises a slope surface 22a and a flat surface 22b. The slope surface 22a is formed so as to gradually protrude out from the airbag module 2 side toward the steering wheel 1 side. The flat surface 22b is formed on the back side of the slope surface 22a, blocked by the slope surface 22a and facing the steering wheel 1 side.

When the airbag module 2 is pressed toward the cored bar member 7 of the steering wheel 1, the elastic piece 21 of the engaging part 18b of the engagement mechanism 18 first contacts the slope surface 22a of the locking part 22 in a slidable manner.

As the airbag module 2 is pressed further, the elastic piece 21 slides down the slope surface 22a. This causes the plate spring 20 to begin bending and deforming.

Furthermore, when the airbag module 2 is further pushed toward the cored bar member 7, the elastic piece 21 moves past the slope surface 22a. When the elastic piece 21 moves past the slope surface 22a, the plate spring 20, which had been bent and deformed by the slope surface 22a, is elastically restored.

The elastic restoring force of the plate spring 20 shifts the elastic piece 21 toward the flat surface 22b. The elastic piece 21 that has moved to the flat surface 22b leaves the slope surface 22a and slides toward the back of said flat surface 22b. As a result, the engaging part 18b of the engagement mechanism 18 is engaged with the locking part 22 of the steering wheel 1.

In the present embodiment, the slope surface 22a of the locking part 22 is directed toward the boss region 8. Therefore, the plate bending deformation of the engagement mechanism 18 occurs between the peripheral wall 4b of the housing 4 and the inflator 6, where the joint part 18a is joined, toward the inflator 6.

The protecting means 30, described below, is designed to protect the deformation of the plate spring 20 (deformation of the engagement mechanism 18), defined as occurring between the engagement mechanism 18 secured to the peripheral wall 4b of the housing 4 and the inflator 6.

Alternatively, the protecting means 31 protects the engagement mechanism 18 by preventing external forces from acting on the engagement mechanism 18 in the first place.

The engagement mechanism 18 is engaged by elastic contact of only the elastic piece 21 on the airbag module 2 side relative to the locking part 22 on the steering wheel 1 side. Therefore, the constant elastic deformation of the plate spring 20 is not disturbed.

The engagement mechanism 18 is mainly composed of the plate spring 20 and is compact, allowing the airbag module 2 to be miniaturized.

The elastic bending deformation of the plate spring 20 can be used to attach the engagement mechanism 18 to the steering wheel 1.

In addition, the engagement mechanism 18 is positioned toward the lower side of the airbag module 2 in the vertical direction (6 o'clock side in the Y-axis direction), which allows the vertical dimension of the airbag module 2 to be reduced.

The engagement mechanism 18 is provided with a rubber or synthetic resin elastic piece 21 that can elastically contact the locking part 22 of the steering wheel 1. Since the engagement mechanism 18 is caused to engage the locking part 22 via the elastic piece 21, the hardness of the elastic piece 21 and the contact allowance of said elastic piece 21 with the locking part 22 can increase the durability of the engagement mechanism 18.

A coil spring 19 is provided in parallel with the engagement mechanism 18. This allows the coil spring 19 to stably support the connection point of the steering wheel 1 and airbag module 2 and the vicinity thereof using the engagement mechanism 18.

The engagement mechanism 18 of the driver seat airbag device is protected by protecting means 30 and 31 of various structures described below. Specifically, the protecting means 30 and 31 receive external forces that cause deformation in the engagement mechanism 18 when the mechanism 18 is not engaged with the steering wheel 1 (non-engaged state). This protects the engagement mechanism 18.

The engagement mechanism 18 is a protrusion protruding from the airbag module 2 toward the steering wheel 1 at the stage before the airbag module 2 is attached to the steering wheel 1 (non-engaged state), as depicted in FIG. 5 and the like. In FIG. 5, the protecting means 30 and 31 are omitted.

The engagement mechanism 18 may be deformed by external forces if only installed on the airbag module 2, or in other words, when not engaged with the steering wheel 1. If an unintended external force is applied to the engagement mechanism 18 before assembly, for example, due to an error in assembly work or removal of the airbag module 2, the external force may cause deformation to the engagement mechanism 18.

The protecting means 30 and 31 are provided to inhibit or prevent such deformation of the engagement mechanism 18.

First Configuration, Embodiment 1

First, the first configuration of the protecting means (protecting means 30) is described. FIG. 4 and FIG. 7 to FIG. 11 depict Embodiment 1 of the first configuration of the protecting means 30.

The protecting means 30 is provided on the joint part 18a side, which is the extending base side opposite to the engaging part 18b, so that deformation of the engagement mechanism 18 caused by external forces and the like, described above, is suppressed in the elastic range. The protecting means 30 is provided in parallel with the engagement mechanism 18 in the vicinity of the engagement mechanism 18.

The statement, "the protecting means 30 is provided on the extending base side (joint part 18a side) of the engagement mechanism 18" means that the protecting means 30 should allow the plate spring 20 to undergo a prescribed elastic deformation in the elastic range required for the engagement of the elastic piece 21 with the locking part 22. This is because it is difficult to ensure the prescribed elastic deformation of the plate spring 20 if the protecting means 30 is provided on the extending tip end (elastic piece 21 side).

The statement, "the protecting means 30 is provided in parallel with the engagement mechanism 18" means that the protecting means 30 should be provided alongside the engagement mechanism 18 on the side of the plate spring 20 approaching the bending deformation that causes the elastic piece 21 to engage the locking part 22, so that the bending deformation of the plate spring 20 is not disturbed.

The statement, "provided in the vicinity of the engagement mechanism 18" means that the area should be between the engagement mechanism 18 and the inflator 6 on the side to which the engagement mechanism 18 is elastically deformed.

Specifically describing Embodiment 1 according to the diagram, a metal wall body 40 is formed integrally as a protecting means 30 in the above-mentioned metal housing 4, which is for component assembly.

The wall body 40 is provided to be positioned in the above area between the engagement mechanism 18 and the inflator 6.

The wall body 40 is positioned so as to face the plate spring 20 of the engagement mechanism 18. In addition, the wall body 40 is positioned along the extending direction of said engagement mechanism 18 (from the airbag module 2 side toward the steering wheel 1 side).

In the description below, the orientation of up/down, left/right, and front/back is for convenience of explanation and is not limited to such orientation depending on the posture of the airbag module 2.

The wall body 40, which is the protecting means 30, is formed by bending the inflator mounting surface 4a of the housing 4, or otherwise rising from the inflator mounting surface 4a in the direction of the extension of the engagement mechanism 18.

In this embodiment, the wall body 40 is provided with a folded part 41 and a pair of extending parts 42. The folded part 41 is the upper end part of the wall body 40 bent forward toward the engagement mechanism 18. The pair of extending parts 42 are parts located directly below the elastic piece 21 in an arrangement that can sandwich the plate spring 20 from either side in the direction of the width of the plate. In other words, the upper end part of the wall body 40 is formed in a U-shape.

A prescribed gap is set in the left-right direction between each extending part 42 and the side edge of the plate spring 20 in the plate width direction so that the elastically deforming plate spring 20 does not interfere with the extending part 42.

Each extending part 42 enables up to a prescribed elastic deformation in the elastic range when the plate spring 20 is elastically deformed by an external force. The lower end of the elastic piece 21 is in contact with each extending part 42 when further elastic deformation of the plate spring occurs. In this manner, the wall body 40 suppresses deformation of the engagement mechanism 18 beyond a prescribed level and receives external forces after the wall body comes into contact with the engagement mechanism.

The left and right edges of the wall body 40 have a fold 43 over each extending part 42 to ensure strength to receive external forces.

In order to enable the prescribed elastic deformation of the plate spring 20, a prescribed gap is set in the front-to-back direction between the folded part 41 of the wall body 40 and the plate surface of the plate spring 20.

In Embodiment 1, when the engagement mechanism 18 is elastically deformed toward the inflator 6 side by the action of an unintended external force, the plate spring 20 is elastically deformed inside the U-shape of the wall body 40 while being prevented from swinging in the left-right direction by a pair of extending parts 42, and if the elastic deformation is within a prescribed range, the external force is removed and the plate spring elastically recovers (range of engagement action).

On the other hand, if the elastic deformation exceeds a prescribed level, the lower end of the elastic piece 21 hits into the extending part 42. This prevents further elastic deformation, and an external force that would deform the plate spring 20 is received by the wall body 40 (housing 4), including the extending part 42. Once the external force is removed, the engagement mechanism 18 is elastically restored.

First Configuration, Embodiment 2

Embodiment 2 of the protecting means 30 has the same configuration and performs the same action as the wall body 40 of Embodiment 1, as depicted in FIG. 12. Therefore, the wall body 45 in Embodiment 2 is also provided to be positioned in the area between the engagement mechanism 18 and the inflator 6 as described above.

The wall body 45 in Embodiment 2 is a metal wall body 45 integrally provided on the inflator 6 instead of the wall body 40 in Embodiment 1, which is integrally provided in the housing 4 by bending and the like. The wall body 45 is provided at the end edge of the outer flange 6a of the inflator 6 by bending said outer flange 6a or by welding together separately fabricated pieces.

First Configuration, Embodiment 3

Embodiment 3 of protecting means 30 consists of an additional plate spring metal wall body 50 in an arrangement overlapping the engagement mechanism 18 from the inflator 6 side, as depicted in FIG. 13. Therefore, the wall body 50 in Embodiment 3 is also provided to be positioned in the area between the engagement mechanism 18 and the inflator 6 as described above.

The wall body 50 extends to a similar height position as the upper end part of the wall body 40 in Embodiment 1 described above.

The elastically deformable wall body 50 is integrally joined to the peripheral wall 4b of the housing 4 by rivets on the extending base side. The wall body 50 is joined to the housing 4 together with the joint part 18a of the engagement mechanism 18.

The wall bodies 50 are spaced apart with a prescribed gap relative to the engagement mechanism 18 to allow for the prescribed elastic deformation of the engagement mechanism 18 that is required when engaging the locking part 22. The wall body 50 overlaps the plate spring 20 when the prescribed elastic deformation is exceeded and suppresses further elastic deformation of the plate spring 20.

In Embodiment 3, when the engagement mechanism 18 is elastically deformed toward the inflator 6 side by the action of an unintended external force, if the elastic deformation is within a prescribed range, the engagement mechanism 18 and wall body 50 do not overlap, and the engagement mechanism 18 elastically recovers (range of engagement action) when the external force is removed.

On the other hand, when the elastic deformation exceeds a prescribed level, the plate spring 20 overlaps the elastic wall body 50. This suppresses further elastic deformation, and an external force that would deform the plate spring 20 is received by the wall body 50. When the external force is removed, both the wall body 50 and the engagement mechanism 18 are elastically restored.

The diagram depicts a case in which a pair of left and right protrusions 51 are formed protruding from the upper end part of the wall body 50. These protruding parts 51 are configured to receive the plate spring 20 around the window 25 of the engagement mechanism 18. These protrusions 51 cause the deformed plate spring 20 to be elastically supported by the wall body 50 over a wide area extending from the joint part 18a to the window 25 on the engaging part 18b side. This ensures that the external force acting on the plate spring 20 is adequately received.

First Configuration, Embodiment 4

Embodiment 4 of the protecting means 30 is a plate or block-shaped set of ribs 55, as depicted in FIG. 14, protruding from the engagement mechanism 18 toward the inflator 6 and capable of contacting said inflator 6. Consequently, the ribs 55 in Embodiment 4 are also provided to be positioned in the area between the engagement mechanism 18 and the inflator 6 as described above.

The elastic deformation of the plate spring 20 shows a greater displacement on the engaging part 18b side of the engagement mechanism 18 than the joint part 18a side. The ribs 55 are provided closer to the engaging part 18b of the engagement mechanism 18. The ribs 55 may be left to right or up and down in the width direction.

The ribs 55 are provided integral to the engagement mechanism 18 by bending a part of said mechanism 18 or by joining separately fabricated pieces.

The protruding tip 56 of the ribs 55 are positioned with a prescribed gap with respect to the inflator 6 to allow for the prescribed elastic deformation of the engagement mechanism 18 that is required when engaging the locking part 22. The ribs 55 are brought into contact with the inflator 6 when the prescribed elastic deformation is exceeded and inhibit further elastic deformation of the plate spring 20.

In Embodiment 4, when the engagement mechanism 18 is elastically deformed toward the inflator 6 side by the action of an unintended external force, if the elastic deformation is within a prescribed range, the ribs 55 do not contact the inflator 6 and the engagement mechanism 18 elastically recovers (range of engagement action) when the external force is removed.

On the other hand, if the elastic deformation exceeds a prescribed level, the ribs 55 contact the inflator 6, further elastic deformation is suppressed, and an external force that would deform the plate spring 20 is received by the inflator 6 via the ribs 55. Once the external force is removed, the engagement mechanism 18 is elastically restored.

First Configuration, Embodiment 5

In Embodiment 5 of the protecting means 30, as depicted in FIG. 15 and FIG. 16, a metal bar 60 is provided between the two bolts 14a on either side of the retainer ring 14 enabling contact by the engagement mechanism 18, facing in a left-right direction that intersects the extending direction of the engagement mechanism 18. The protecting means 30 consists of a crossbeam part in the form of a portal bridge crossbeam with the bar 60 as the crossbeam and the two bolts 14a as the leg parts supporting the bar 60.

The bar 60 or bridge crossbeam structure in Embodiment 5 is also provided so that the bolts 14a of the retainer ring 14 are between the engagement mechanism 18 and the inflators 6, so that they are positioned in the above area between the engagement mechanism 18 and the inflator 6.

The bar 60 is provided integrally fixed to each bolt 14a by welded joints or other means.

The bar 60 is positioned with a prescribed gap relative to the engagement mechanism 18 to allow for the prescribed elastic deformation of the engagement mechanism 18 that is required when engaging the locking part 22. The bar 60 abuts the engagement mechanism 18 when the prescribed elastic deformation is exceeded, which inhibits further elastic deformation of the plate spring 20.

In Embodiment 5, when the engagement mechanism 18 is elastically deformed toward the inflator 6 side by the action of an unintended external force, if the elastic deformation is within a prescribed range, the engagement mechanism 18 is elastically restored without abutting the bar 60 (range of engagement action) when the external force is removed.

On the other hand, if the elastic deformation exceeds a prescribed level, the engagement mechanism 18 contacts the bar 60, further elastic deformation is inhibited, and an external force that would deform the plate spring 20 is received by the bar 60 and bolts 14a. Once the external force is removed, the engagement mechanism 18 is elastically restored.

First Configuration, Embodiment 6

Embodiment 6 of protecting means 30 is composed of a separately fabricated metal plate bracket 65 in the form of a gantry bridge form, instead of Embodiment 5, which consists of a gantry bridge structure with bolts 14a and bars 60, as depicted in FIG. 17 and FIG. 18.

The bracket 65 consists of a pair of leg parts 66 on either side and a crossbeam part 67 provided between leg parts 66 in a left-right direction that intersects the extending direction of the engaging mechanism 18 so that the engagement mechanism 18 can come into contact thereon. The leg parts 66 are secured to the inflator mounting surface 4a of the housing 4 by being tightened together with the inflator 6, with nuts 15, to the two bolts 14a on either side between the engagement mechanism 18 and the inflator 6.

Therefore, the bracket 65 in Embodiment 6 is also provided to be positioned in the area between the engagement mechanism 18 and the inflator 6 as described above.

The crossbeam part 67 of the bracket 65 is positioned with a prescribed gap relative to the engagement mechanism 18 to allow for the prescribed elastic deformation of the mechanism 18 that is required when engaging the locking part 22. The crossbeam part 67 comes into contact with the engagement mechanism 18 when the prescribed elastic deformation is exceeded, which inhibits further elastic deformation of the plate spring 20.

In Embodiment 6, when the engagement mechanism 18 is elastically deformed toward the inflator 6 side by the action of an unintended external force, if the elastic deformation is within a prescribed range, the engagement mechanism 18 is elastically restored without abutting the bracket 65 (range of engagement action) when the external force is removed.

On the other hand, if the elastic deformation exceeds a prescribed level, the engagement mechanism 18 contacts the crossbeam part 67 of the bracket 65, further elastic deformation is suppressed, and an external force that would deform the plate spring 20 is received by the bracket 65 and housing 4. Once the external force is removed, the engagement mechanism 18 is elastically restored.

First Configuration, Embodiment 7

As depicted in FIG. 19 and FIG. 20, protecting means of Embodiment 7 is composed of a metal plate bracket 70 provided by being joined to the housing 4 in place of the plate bracket 65 secured to the housing 4 by a bolt 14a and nut 15 of Embodiment 6.

The bracket 70 is integrally joined to the peripheral wall 4a of the housing 4 by rivets or other means. The bracket 70 consists of a pair of leg parts 71 extending in the extending direction of the engagement mechanism 18, and a U-shaped crossbeam part 72 that surrounds the engagement mechanism 18 in the area described above, formed by folding backward from the upper ends of these legs 71 toward the inflator 6 side.

The crossbeam part 72 is positioned between the leg parts 71, as in Embodiments 5 and 6, in a left-right direction that intersects the extending direction of the engagement mechanism 18, so that the engagement mechanism 18 can come into contact therewith.

Thus, in the bracket 70 of Embodiment 7, the U-shaped crossbeam part 72 is positioned in the area between the engagement mechanism 18 and the inflator 6 as described above.

The crossbeam part 72 of the bracket 70 leaves a prescribed gap with respect to the engagement mechanism 18 to allow the prescribed elastic deformation of the engagement mechanism 18 required for engagement with the locking part 22, and the crossbeam part 72 abuts the engagement mechanism 18 when the prescribed elastic deformation is exceeded to inhibit further elastic deformation of the plate spring 20.

In Embodiment 7, when the engagement mechanism 18 is elastically deformed toward the inflator 6 side by the action of an unintended external force, if the elastic deformation is within a prescribed range, the engagement mechanism 18 is elastically restored without abutting the bracket 70 (range of engagement action) when the external force is removed.

On the other hand, if the elastic deformation exceeds a prescribed level, the engagement mechanism 18 contacts the crossbeam part 72 of the bracket 70, further elastic deformation is inhibited, and an external force that would deform the plate spring 20 is received by the bracket 70. Once the external force is removed, the engagement mechanism 18 is elastically restored.

First Configuration, Embodiment 8

As depicted in FIG. 21 and FIG. 22, protecting means 30 of Embodiment 8 is composed of an arm body 75 extending to the region in place of the wall body 40 formed on the housing 4 in Embodiment 1. The arm bodies 75 are integrally molded into the plastic pad cover 3 that covers the airbag cushion 5 and forms the design surface of the airbag module 2.

The arm bodies 75 are formed in pairs on the left and right in an arrangement that sandwiches the engagement mechanism 18 from both the left and right sides. Each arm body 75 is formed in an L-shape with the tip end bent part 77 bent from a wide base plate 76. The base plate 76 connects to the pad cover 3, and the tip end bent part 77 protrudes toward the inflator 6 side. The arm bodies 75 should be thicker and more rigid than the pad cover 3 itself.

For the arm bodies 75, the base plate 76 extends in the extending direction of the engagement mechanism 18. The arms 75 are positioned in the area between the engagement mechanism 18 and the inflator 6 as described above, with the tip end bent part 77 crossing the side of the engagement mechanism 18 from the outer edge of the pad cover 3.

Each tip end bent part 77 of the pair of arm bodies 75 is positioned directly below the elastic piece 21. A prescribed gap is set in the left-right direction between each arm body 75 and the side edge of the plate spring 20 in the plate width direction so that the elastically deforming plate spring 20 does not interfere with the arm bodies 75.

Each tip end bent part 77 allows up to a prescribed elastic deformation in the elastic range when the plate spring 20 is elastically deformed by an external force. The lower end of the elastic piece 21 is in contact with each tip end bent part 77 when further elastic deformation occurs. This prevents the engagement mechanism 18 from deforming beyond a prescribed level, and is designed to receive external forces after coming into contact.

In Embodiment 8, when the engagement mechanism 18 is elastically deformed toward the inflator 6 side by the action of an unintended external force, the plate spring 20 is elastically deformed between the tip end bent parts 77 while being prevented from swinging in the left-right direction by a pair of arm bodies 75. If the elastic deformation is within a prescribed range, the elastic restoration is achieved when the external force is removed (range of engagement action).

On the other hand, if the elastic deformation exceeds a prescribed level, the lower end of the elastic piece 21 lands on the tip end bent parts 77. This prevents further elastic deformation, and an external force that would deform the plate spring 20 is received by the arm body 75 including the tip bend 77. Once the external force is removed, the engagement mechanism 18 is elastically restored.

Second Configuration, Embodiment 1

Next, the second configuration of protecting means (protecting means 31) is described. FIG. 23 and FIG. 24 show Embodiment 1 of a second configuration of protecting means 31.

The protecting means 31 is provided to prevent external forces from acting on the engagement mechanism 18. The protecting means 31 is provided in parallel to the engagement mechanism 18 for at least one location in the vicinity of the engagement mechanism 18. The protecting means 31 is provided protruding toward the steering wheel 1 side more than the extending tip end (elastic piece 21) of the engagement mechanism 18.

The statement, "the protecting means 31 is provided protruding toward the steering wheel 1 from the extending tip end (elastic piece 21) of the engagement mechanism 18" means that the protecting means 31 should intercept external forces that would act on the engagement mechanism 18 and that the protecting means 31 should receive such external forces.

The statement, "the protecting means 31 is provided in parallel with the engagement mechanism 18" means that the protecting means 31 should be provided alongside the engagement mechanism 18 so as not to interfere with the bending deformation that causes the elastic piece 21 to engage the locking part 22.

The statement, "provided in the vicinity of the engagement mechanism 18" means that the protecting means 31 should not be provided at such a distance that external forces could act on the engagement mechanism 18.

Specifically describing Embodiment 1 according to the diagram, ribs 80 are integrally molded into the pad cover 3 as protecting means 31, extending along the extending direction of the engagement mechanism 18. The ribs 80 should be thicker and more rigid than the pad cover 3 itself.

One rib 80 is provided on either side of the engagement mechanism 18 (depicted as a solid line in the diagram). Alternatively, the ribs 80 are arranged so as to sandwich the engagement mechanism 18, with two in a left-right pair (in the diagram, one is depicted as a solid line and the other as a virtual line) on either side of the engagement mechanism 18.

The ribs 80 are provided next to each other with a slight gap on the left and right sides of the engagement mechanism 18 so that they do not face the plate surface of the plate spring 20 to be bent and deformed and are not separated from the plate spring 20.

The ribs 80 protrude above (on the steering wheel 1 side) the elastic piece 21 of the engagement mechanism 18 in the extending direction and are formed at a length that does not interfere with the horn function.

In Embodiment 1, whether there is one rib 80 or a pair of ribs 80 on either side, any unintended external force that would act on the engagement mechanism 18 is intercepted by the ribs 80, and the external force is received by the ribs 80 to prevent the engagement mechanism 18 from being deformed.

When the elastic piece 21 of the engagement mechanism 18 engages the locking part 22, the engagement mechanism 18 can bend and deform unimpeded by the ribs 80 and be assembled to the steering wheel 1 side.

Second Configuration, Embodiment 2

As depicted in FIG. 25 and FIG. 26, the protecting means 31 of Embodiment 2 is composed of attaching a metal or resin sleeve 85 so as to cover the bolt 14a of the retainer ring 14, in place of the ribs 80 integrally formed on the pad cover 3 in Embodiment 1.

The sleeve 85 is provided along the extending direction of the engagement mechanism 18. One sleeve 85 is provided for any one of the bolts 14a (depicted in solid line in the diagram) located on either side of the engagement mechanism 18, in an arrangement that flanks the engagement mechanism 18. Alternatively, two sleeves 85 are provided for each of the two left and right sides of the engagement mechanism 18 (in the diagram, one is depicted with a solid line and the other with a dotted line).

The sleeve 85 is provided at the side of the engagement mechanism 18 in the left-right direction, toward the side of the inflator 6, so that the sleeve does not face the plate surface of the plate spring 20 to be bent and deformed, and so that the sleeve is not separated from the plate spring 20.

The sleeve 85 protrudes above the elastic piece 21 of the engagement mechanism 18 (on the steering wheel 1 side) in the extending direction and is set to a length that does not interfere with the horn function.

As a further variation of Embodiment 2, when two sleeves 85 are provided as protecting means 31, a crossbeam part 86 may be provided between the upper ends of the sleeves 85 in a direction that intersects the extending direction of the engagement mechanism 18, as depicted by the virtual line in the diagram. The two sleeves 85 and the crossbeam part 86 thus constitute a gate-shaped protecting means 31. The crossbeam part 86 is provided to hang above the elastic piece 21.

In Embodiment 2, as in Embodiment 1 described above, whether there is one sleeve 85, a pair of left and right sleeves, or a crossbeam part 86, unintended external forces acting on the engagement mechanism 18 are intercepted by the sleeves 85 and crossbeam part 86, and the external forces are received by the sleeve 85 and crossbeam part 86 to prevent the engagement mechanism 18 from being deformed.

When the elastic piece 21 of the engagement mechanism 18 engages the locking part 22, the engagement mechanism 18 can be bent and deformed without being obstructed by the sleeve 85 and can pass under the crossbeam part 86, if present, which enables assembly to the steering wheel 1 side.

Second Configuration, Embodiment 3

Embodiment 3 of the protecting means 31 consists of a bracket 90 that is riveted or otherwise joined to the peripheral wall 4b of the housing 4 instead of the sleeve 85 of Embodiment 2 that is attached to the bolt 14a, as depicted in FIG. 27 and FIG. 28. The bracket 90 is formed of a metal plate.

The bracket 90 is integrally provided on the peripheral wall 4b of the housing 4, extending along the extending direction of the engagement mechanism 18 as a protecting means 31.

The bracket 90 has one end joined to the peripheral wall 4b in the extending direction, and the other end is positioned on the side of the elastic piece 21.

One bracket 90 is provided on either side of the engagement mechanism 18 (depicted in solid line in the diagram). Alternatively, two brackets 90 are provided in a pair on either side of the engagement mechanism 18 (in the diagram, one is depicted with a solid line and the other with a dotted line), in an arrangement that sandwiches the engagement mechanism 18.

The brackets 90 are provided adjacent to the left and right sides of the engagement mechanism 18 with a small gap therebetween so that they do not face the plate surface of the plate spring 20 to be bent and deformed and are not separated from the plate spring 20.

The brackets 90 protrude above the elastic piece 21 of the engagement mechanism 18 (on the steering wheel 1 side) in the extending direction and are formed at a length that does not interfere with the horn function.

As a further variation of Embodiment 3, when two brackets 90 are provided as protecting means 31, a crossbeam part 91 may be provided between the other ends of the brackets 90 in a direction that intersects the extending direction of the engagement mechanism 18, as depicted by the imaginary line in the diagram. The two brackets 90 and the crossbeam part 91 thus constitute the protecting means 31. The crossbeam part 91 is provided above the elastic piece 21.

In Embodiment 3, as in Embodiment 1 and 2 described above, whether there is one bracket 90, a pair of left and right brackets, or a crossbeam part 91, unintended external forces acting on the engagement mechanism 18 are intercepted by the brackets 90 or crossbeam part 91, and the external forces are received by the brackets 90 or crossbeam part 91 to prevent the engagement mechanism 18 from being deformed.

When the elastic piece 21 of the engagement mechanism 18 engages the locking part 22, the engagement mechanism 18 can be bent and deformed without being obstructed by the bracket 90 and can pass under the crossbeam part 91, if present, thus enabling assembling to the steering wheel 1 side.

Second Configuration, Embodiment 4

As depicted in FIG. 29, the protecting means 31 of Embodiment 4 is composed of extending the bolt 14a for mounting the inflator in the extending direction of the engagement mechanism 18 in place of the sleeve 85 attached to and covering the bolt 14a in Embodiment 2.

The arrangement sandwiching the engagement mechanism 18 is formed by extending either one of the bolts 14a (depicted as a solid line in the diagram) located on either side of the engagement mechanism 18, or the two bolts 14a (one depicted as a solid line and the other as a dotted line) on either side of the engagement mechanism 18.

The bolts 14a are provided on the left and right side of the engagement mechanism 18 in an arrangement closer to the side of the inflator 6, so that they do not face the surface of the plate spring 20 to be bent and deformed, and so that they are not separated from the plate spring 20.

The bolts 14a protrude above (toward the steering wheel 1) the elastic piece 21 of the engagement mechanism 18 in the extending direction (extend direction) and are extended to a length that does not interfere with the horn function.

In Embodiment 4, as in Embodiment 1 and 2 described above, whether the extended bolt 14*a* is a single bolt or a pair of two bolts on either side, any unintended external force that would act on the engagement mechanism 18 is intercepted by the bolts 14*a*, and the external force is received by the bolts 14*a* to prevent the engagement mechanism 18 from being deformed.

When the elastic piece 21 of the engagement mechanism 18 engages the locking part 22, the engagement mechanism 18 can be bent and deformed unimpeded by the extended bolt 14*a* and thus assembled to the steering wheel 1 side.

In any of the driver seat airbag devices of this embodiment described above, the protecting means 30 and 31 described above are provided for the engagement mechanism 18, which is installed in parallel with the damper unit 11 and assembled to the steering wheel 1, to maintain smooth assembly of the engagement mechanism 18 to the steering wheel 1, and the engagement mechanism 18 can be appropriately prevented from being damaged by external forces until the installation of the airbag module 2 to the steering wheel 1 is complete. Specifically, it is possible to prevent unintended external forces from acting on the engagement mechanism 18 before assembly, for example, due to errors in assembly work or removal of the airbag module 2.

This enables the driver seat airbag device to perform as designed.

The driver seat airbag device described above is a preferred example of the present invention, and other embodiment examples can also be implemented or carried out in various ways. In particular, unless otherwise described in the specification of the application, the invention is not restricted to the shapes, sizes, configurational dispositions, and the like of the parts illustrated in detail in the accompanying drawings. In addition, the expressions and terms used in the specification of the application are used for providing a description, without limiting the invention thereto, unless specifically described otherwise.

EXPLANATION OF CODES

1. Steering wheel
2. Airbag module
3. Pad cover
4. Housing
5. Airbag cushion
6. Inflator
11. Damper unit
14. Retainer ring
14*a*. Bolt
18. Engagement mechanism
18*a*. Joint part
18*b*. Engaging part

What is claimed is:

1. A driver seat airbag device, comprising:
   an airbag module provided with an airbag cushion and inflator for expanding and deploying the airbag cushion, and serving as a damper mass for a steering wheel;
   one or more damper units provided in between the airbag module and the steering wheel for damping vibration of the steering wheel;
   an engagement mechanism provided in the airbag module in parallel with the one or more damper units, for engaging with the steering wheel, and retaining the airbag module on the steering wheel while enabling relative displacement; and
   protecting means provided in the airbag module, the protecting means accepting external force that causes deformation of the engagement mechanism to protect the engagement mechanism in a state in which the engagement mechanism is disengaged from the steering wheel.

2. The driver seat airbag device according to claim 1, wherein:
   the engagement mechanism is formed to be elastically deformable extending from the airbag module to a steering wheel side, and includes a hook on the extending tip end side that engages with the steering wheel, and
   the protecting means is provided in parallel with the engagement mechanism on an extending base side opposite to the extending tip end side and in the vicinity of the engagement mechanism so as to suppress deformation of the engagement mechanism that may occur due to external forces.

3. The driver seat airbag device according to claim 1, wherein:
   the protecting means is provided in the airbag module so as to be positioned in a region between the inflator and the engagement mechanism.

4. The driver seat airbag device according to claim 3, wherein:
   the protecting means is a wall body provided in said region and having a wall surface along an extending direction of the engagement mechanism.

5. The driver seat airbag device according to claim 4, wherein the airbag module has a housing for mounting parts, and the wall body is formed integrally in the housing.

6. The driver seat airbag device according to claim 3, wherein:
   the protecting means is ribs provided in said region, protruding from the engagement mechanism toward the inflator, enabling contact with the inflator.

7. The driver seat airbag device according to claim 3, wherein:
   the protecting means is provided in said region, and is configured of a crossbeam part extending in a direction intersecting the extending direction of the engagement mechanism so that the engagement mechanism can abut thereon, and a supporting leg part supporting the crossbeam part.

8. The driver seat airbag device according to claim 3, wherein:
   the airbag module has a pad cover forming a design surface, and the protecting means is integrally formed with the pad cover and extends to said region.

9. The driver seat airbag device according to claim 1, wherein:
   the engagement mechanism is formed elastically deformable extending from the airbag module toward the steering wheel, and includes a hook on an extending tip end side that engages with the steering wheel; and
   the protecting means is provided in parallel with the engagement mechanism in at least one location in the vicinity of the engagement mechanism such that the protecting means protrude more toward a steering wheel side than an extending tip end of the engagement mechanism.

10. The driver seat airbag device according to claim 9, wherein:
   the airbag module has a pad cover forming a design surface, and the protecting means is integrally formed with the pad cover.

11. The driver seat airbag device according to claim 9, wherein:
   the airbag module has a retainer, the retainer has a bolt for mounting the inflator to the airbag module, and the protecting means is a sleeve provided on the bolt.

12. The driver seat airbag device according to claim 9, wherein the airbag module has a retainer, the retainer has a bolt for mounting the inflator to the airbag module, and the protecting means is an extension of the bolt.

13. The driver seat airbag device according to claim 9, wherein:
   the airbag module has a housing for mounting parts, and the protecting means is a board provided in the housing.

14. The driver seat airbag device according to claim 9, wherein:
   the protecting means is provided on both sides of the engagement mechanism so as to sandwich the engagement mechanism.

15. The driver seat airbag device according to claim 14, wherein two protecting means are provided, positioned on both sides of the engagement mechanism, and a cross-beam part is provided in between the plurality of protecting means in a direction intersecting the extending direction of the engagement mechanism in a manner enabling contact with the engagement mechanism.

* * * * *